(12) United States Patent
Fackler et al.

(10) Patent No.: US 7,703,266 B2
(45) Date of Patent: Apr. 27, 2010

(54) METHOD FOR MANAGING THE ELECTRICAL CONTROL SYSTEM OF A WINDROWER HEADER FLOTATION AND LIFT SYSTEM

(75) Inventors: Robert L. Fackler, Ephrata, PA (US);
Douglas R. Otto, Ephrata, PA (US);
Charles H. Hoffman, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/476,608

(22) Filed: Jun. 2, 2009

(65) Prior Publication Data

US 2009/0235626 A1 Sep. 24, 2009

Related U.S. Application Data

(60) Division of application No. 11/486,495, filed on Jul. 14, 2006, now Pat. No. 7,555,883, which is a continuation-in-part of application No. 10/822,465, filed on Apr. 12, 2004, now Pat. No. 7,168,226.

(60) Provisional application No. 60/699,271, filed on Jul. 14, 2005, provisional application No. 60/699,548, filed on Jul. 15, 2005.

(51) Int. Cl.
*A01D 41/14* (2006.01)
*A01D 46/08* (2006.01)
*A01D 75/28* (2006.01)

(52) U.S. Cl. .................... 56/10.2 E; 701/50

(58) Field of Classification Search .................. 701/50; 56/10.2 E, 10 R, 10.2 G, 14.9–15.2, 15.9, 56/16.2, 208–212
See application file for complete search history.

(56) References Cited

U.S. PATENT DOCUMENTS

| 3,603,066 | A | 9/1971 | Burrough et al. ............... 56/208 |
| 3,908,345 | A | 9/1975 | Oni et al. ....................... 56/208 |
| 4,335,561 | A | 6/1982 | Swanson et al. ............. 56/10.2 |
| 4,523,886 | A | 6/1985 | Reeves ......................... 414/641 |
| 4,527,381 | A | 7/1985 | Mann ........................... 56/209 |
| 4,612,757 | A | 9/1986 | Halls et al. .................... 56/10.2 |
| 4,622,803 | A | 11/1986 | Lech ........................... 56/10.2 |
| 4,648,466 | A | 3/1987 | Baker et al. ............... 172/260.5 |
| 4,676,053 | A | 6/1987 | Pruitt .......................... 56/208 |
| 4,733,523 | A | 3/1988 | Dedeyne et al. ............... 56/209 |
| 5,359,836 | A | 11/1994 | Zeuner et al. ................ 56/10.2 |
| 5,415,586 | A | 5/1995 | Hanson et al. .................. 460/8 |
| 5,455,769 | A | 10/1995 | Panoushek et al. ............ 701/50 |
| 5,463,854 | A | 11/1995 | Chmielewski, Jr. et al. ....................... 56/10.2 E |
| 5,469,694 | A | 11/1995 | Panousheck et al. ...... 56/10.2 E |
| 5,471,823 | A | 12/1995 | Panoushek et al. ........ 56/10.2 E |

(Continued)

*Primary Examiner*—Árpád Fábián-Kovács
(74) *Attorney, Agent, or Firm*—Patrick M. Sheldrake; John William Stader; Michael G. Harms

(57) ABSTRACT

A system and method for managing the electrical control system of a header flotation and lift system of an agricultural harvesting machine, particularly one using only once fluid cylinder in connection with each respective side of the header, which system and method, in addition to executing header raise and lower commands, provides several automatically executable operating modes for the flotation and lift system, including a wake-up mode; a normal mode, which can include float; a charge accumulator mode; a transport mode; and a header remove mode, and the ability to seamlessly and easily transition between the modes.

9 Claims, 38 Drawing Sheets

U.S. PATENT DOCUMENTS

| | | |
|---|---|---|
| 5,471,825 A | 12/1995 | Panoushek et al. ......... 56/10.2 E |
| 5,473,870 A | 12/1995 | Panoushek et al. ......... 56/10.2 E |
| 5,524,424 A | 6/1996 | Halgrimson et al. ..... 56/10.2 D |
| 5,577,373 A | 11/1996 | Panoushek et al. ......... 56/10.2 E |
| 5,613,352 A | 3/1997 | Panoushek et al. ......... 56/10.2 E |
| 5,633,452 A | 5/1997 | Bebernes ....................... 73/37 |
| 5,684,691 A | 11/1997 | Orbach et al. ................. 700/56 |
| 5,704,200 A | 1/1998 | Chmielewski, Jr. et al. ....................... 56/10.2 E |
| 5,778,644 A | 7/1998 | Keller et al. .................. 56/11.2 |
| 5,810,095 A | 9/1998 | Orbach et al. .................. 172/2 |
| 5,906,089 A | 5/1999 | Guinn et al. ................. 56/10.2 |
| 5,964,077 A | 10/1999 | Guinn ........................ 56/10.2 |
| 5,983,615 A | 11/1999 | Schmid et al. .................. 56/208 |
| 6,058,343 A | 5/2000 | Orbach et al. ................. 701/50 |
| 6,105,679 A | 8/2000 | Schubert et al. ................ 172/4 |
| 6,119,442 A | 9/2000 | Hale ...................... 56/10.2 H |
| 6,151,874 A | 11/2000 | Eis ............................. 56/10.2 |
| 6,167,337 A | 12/2000 | Haack et al. .................. 701/50 |
| 6,292,729 B2 | 9/2001 | Falck et al. ................... 701/50 |
| 6,345,490 B1 | 2/2002 | Wolff ......................... 56/15.2 |
| 6,588,187 B2 | 7/2003 | Engelstad et al. ......... 56/10.2 E |
| 6,591,591 B2 | 7/2003 | Coers et al. ............... 56/10.2 G |
| 6,681,551 B1 | 1/2004 | Sheidler et al. ........... 56/10.2 G |
| 6,813,873 B2 | 11/2004 | Allwörden et al. ........ 56/10.2 E |
| 6,865,870 B2 | 3/2005 | Heisey .................... 56/10.2 G |
| 6,871,483 B1 | 3/2005 | Panoushek ............... 56/10.2 E |
| 6,901,729 B1 | 6/2005 | Otto et al. ...................... 56/208 |
| 7,168,229 B1 * | 1/2007 | Hoffman et al. .............. 56/208 |
| 7,207,164 B2 * | 4/2007 | Bomleny ................ 56/10.2 E |
| 7,222,475 B2 * | 5/2007 | Bomleny et al. .......... 56/10.2 E |
| 7,430,846 B2 | 10/2008 | Bomleny et al. .......... 56/10.2 E |
| 2002/0178710 A1 | 12/2002 | Engelstad et al. ......... 56/10.2 E |
| 2003/0000193 A1 | 1/2003 | Beck et al. ................ 56/10.2 E |
| 2003/0019196 A1* | 1/2003 | Coers et al. .............. 56/10.2 G |
| 2003/0140609 A1 | 7/2003 | Beaujot .................. 56/10.2 E |
| 2004/0040276 A1 | 3/2004 | Allworden et al. ....... 56/10.2 R |
| 2004/0050025 A1 | 3/2004 | Vandendriessche et al. ....................... 56/10.2 R |
| 2004/0128966 A1 | 7/2004 | Kempf ...................... 56/10.8 |

* cited by examiner

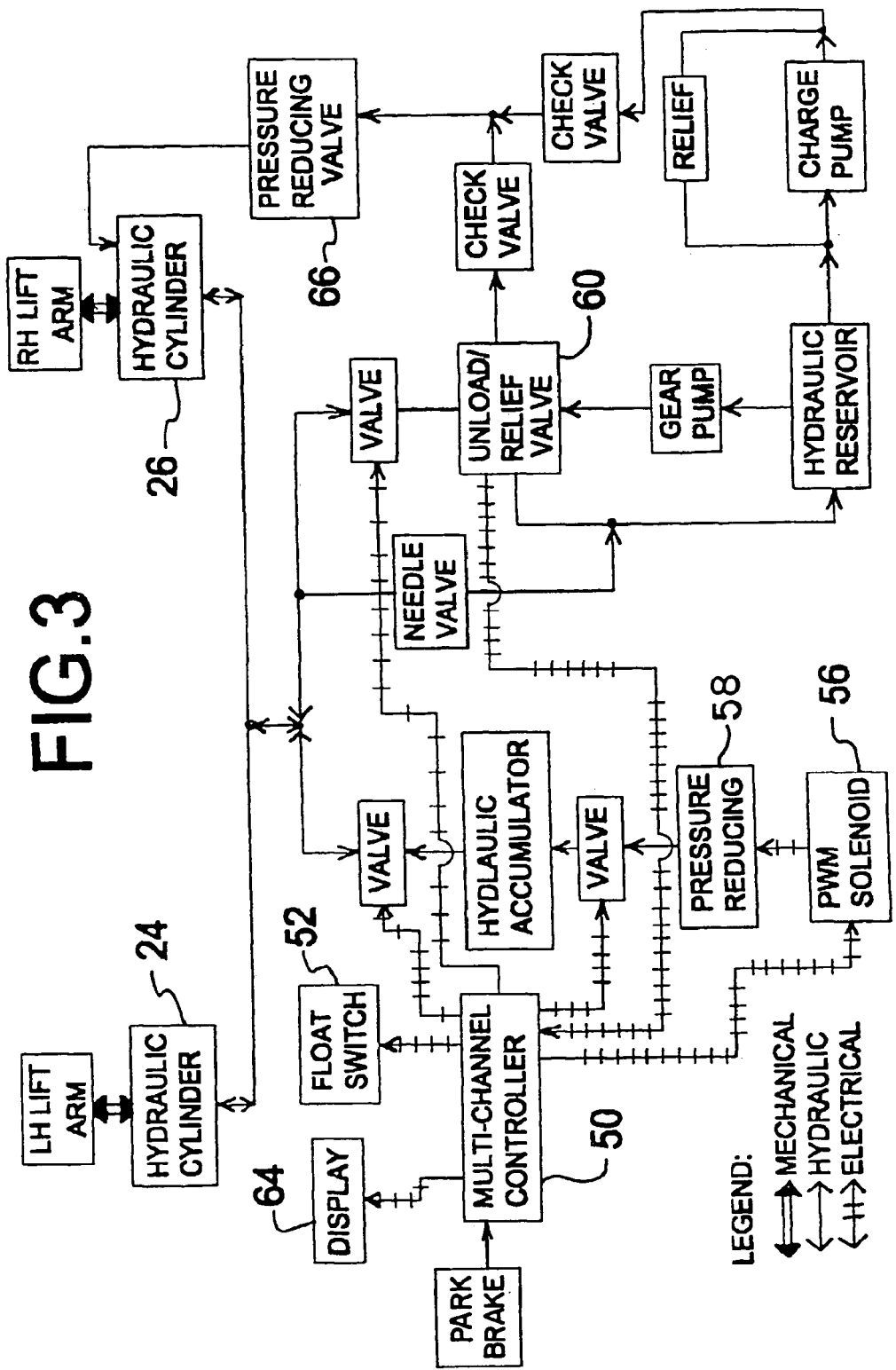

```
// Oct 9, 2004 - Take this offline but keep in the source files for future reinstatement
//    enum _hdr_transport_states{ TRANSPORT_INIT, TRANSPORT_1, TRANSPORT_2, TRANSPORT_3 };
45  // UNITS
    /*...............
       MAPPING
50  ...............*/

// REFERENCES:

55  // INPUTS: DIGITAL - POSITIVE LOGIC...ON = NON-ZERO...OFF = 0.

// INPUTS: ANALOG
    #define _gnd_speed_x_ten    ( Gnd_speed_x_ten.filtered )

// OUTPUTS: DIGITAL - POSITIVE LOGIC...ON = NON-ZERO...OFF = 0.
60  #define _hdr_emerg_stop_debounced    iomap_digin_swstate_S17_hdr_pto_emerg_stop.debounced

// OUTPUTS: PWM TYPE

/*...............
65   VARIABLES
    ...............*/

// GLOBAL SCOPE
    unsigned int  Flotation_left_desired_psi_b0_ui;
70  unsigned int  Flotation_right_desired_psi_b0_ui;
    unsigned char _LH_compensation_installed_b0_uc;

// MODULE SCOPE
    static unsigned char        _inhibit_trim_adj_b0_uc;
75  static unsigned char        _this_is_the_first_header_lower_push_b0_uc;
    static unsigned int         _operator_left_setpoint_psi_b0_ui;
    static unsigned int         _operator_right_setpoint_psi_b0_ui;
    static enum _hdr_normal_states   _hdr_normal_state_b0_ui;
    static enum _hdr_remove_states   _hdr_remove_state_b0_ui;
80
    // Oct 9, 2004 - Take this offline but keep in the source files for future reinstatement
    //    static enum _hdr_transport_states   _transport_state_b0_ui;

static unsigned char        _last_push_was_header_raise_b0_uc;
```

Fig. 4

```
 85    static  signed int                  _pressure_offset_psi_b0_si;

/*************
       FUNCTION PROTOTYPING - MODULE SCOPE
 90   *************/
       static  void    _reset_header_operating_mode_state_machine( void );
       static  void    _reset_hdr_remove_state_machine( void );

// Oct 9, 2004 - Take this offline but keep in the source files for future reinstatement
 95 //  static  void    _reset_hdr_transport_state_machine( void );

static  void    flotation_state_machine_init( void );
       static  void    flotation_state_machine_main( void );
       static  void    _set_hdr_remove_state_machine_when_waking_up_in_remove_mode( void );
100    static  unsigned int  accumulator_charging_time_b0_ui( unsigned int );

/*************************************************************/
      bit flotation( const unsigned int machine_mode_b0_ui )
105   {
       switch( machine_mode_b0_ui )
       {
          case INIT_main_STATE_MACHINE:
110       case CRITICAL_EE_VARS_OUT_OF_BOUNDS:
          case WAKEUP_TEST_OUTPUTS:
          case WAKEUP_LIGHTS_ONLY:
          case NORMAL_ENGINE_OFF:
          case NORMAL_ENGINE_STARTING:
115       case DIAG_N_SETUP_ENGINE_OFF:
          case CALIBRATION_ENGINE_STARTING:
          case POWER_DOWN:
          case CALIBRATION_ENGINE_RUNNING:
          case XCM_SETUP:
120          // do nothing
             return(0);                            // signify a normal return case WAKEUP_APPLICATION_INIT:
125          flotation_state_machine_init();
             return(0);                            // signify a normal return
```

Fig. 5

```
case NORMAL_ENGINE_RUNNING:
130     flotation_state_machine_main();        // run the state machine
        return(0);                              // signify a normal return
    }
135 /***************************************************/
    static void flotation_state_machine_init( void )
    {
140     Trim_switches_init();
        Trim_state_reset_state_machine();
145     if( ee_flotation_header_operating_mode_nbl != HDR_REMOVE )
        {
            _reset_header_operating_mode_state_machine();
            _reset_hdr_remove_state_machine();
        }
        else
150         _set_hdr_remove_state_machine_when_waking_up_in_romove_mode();
        Flotation_state_reset_hdr_normal_state_machine();
        // Oct 9, 2004 - Take this offline but keep in the source files for future reinstatement
155 //  _reset_hdr_transport_state_machine();
        _inhibit_trim_adj_b0_uc =TRUE;                        // disallow trim adjust
        _this_is_the_first_header_lower_push_b0_uc =TRUE;
160     _last_push_was_header_raise_b0_uc =TRUE;              // set flag
        if( _independant_float_type_b_xp )
            _LH_compensation_installed_b0_uc = FALSE;
        else
165     if( draper_header_installed_b_xp )
            _LH_compensation_installed_b0_uc =TRUE;
            else
```

Fig. 6

```
        _LH_compensation_installed_b0_uc = FALSE;
170  }
     /*********************************************************************/
     static void flotation_state_machine_main( void )
175  {
        static unsigned int  _timer1_b0_ui, _timer4_b0_ui, _timer5_b0_ui;
        static unsigned int  _pressure_minimum_psi_b0_ui;
        static unsigned int  _pressure_offset_sec_b0_ui;

180     switch( ee_flotation_header_operating_mode_nbl )
        {
        /*******************
185      HEADER WAKEUP MODE
         *******************/
         default:
190      case HDR_WAKEUP:
            // TBD - may need to start off with time-based stuff in here
            Trim_switches_init();

195         Flotation_state_reset_hdr_normal_state_machine();
            _reset_hdr_remove_state_machine();
            // Oct 9, 2004 - Take this offline but keep in the source files for future reinstatement
200  //     _reset_hdr_transport_state_machine();
            ee_flotation_header_operating_mode_nbl = HDR_NORMAL;      // disallow trim adjust
            _inhibit_trim_adj_b0_uc =TRUE;
            _this_is_the_first_header_lower_push_b0_uc =TRUE;
205         _last_push_was_header_raise_b0_uc =TRUE;                  // set flag break;
         /*******************
210       HEADER NORMAL MODE
```

```
case HDR_NORMAL:

215     // GET TRIM SWITCH INFORMATION
        if( _hdr_normal_state_b0_ui != CHARGE_ACCUM_1      // don't allow this function call if
        && _hdr_normal_state_b0_ui != CHARGE_ACCUM_2       // we're charging the accumulators
        ) Trim_switches_main();
                                                           // updates _operator_left_setpoint_psi_b0_ui 220     switch(_hdr_normal_state_b0_ui)
        {
        default:
        case CHECK_SWITCHES:

225         _timer1_b0_ui = 0;                             // clr the timer if( hdr_raise_debounced_bt )                   // header raise on
            {
                _last_push_was_header_raise_b0_uc = TRUE;  // set flag
230             _inhibit_trim_adj_b0_uc = TRUE;            // disallow trim adjust
                Trim_state_reset_state_machine();          // reset the Trim state machine
                _hdr_normal_state_b0_ui = RAISE_1;
                HSD_hydr_master_on_b_xp = TRUE;
                Flotation_display_float_settings();        // display on demand
235         }
            else
            if( hdr_lower_debounced_bt )                   // header lower on
            {
                _inhibit_trim_adj_b0_uc = TRUE;            // disallow trim adjust
240             Trim_state_reset_state_machine();          // reset the Trim state machine
                _hdr_normal_state_b0_ui = CHECK_FLOTATION_SETTINGS;
            }

245     break;

case CHECK_FLOTATION_SETTINGS:

_pressure_minimum_psi_b0_ui = DEFAULT_MIN_PRESSURE_psi_b0_ui;
250         _pressure_offset_sec_b0_ui = DEFAULT_HEAVIER_TIME_sec_b0_ui;

// Good test - hopefully isn't necessary if trim_switches() did its thing
            if( _operator_right_setpoint_psi_b0_ui < _pressure_minimum_psi_b0_ui )   // Test for above-minimum trim settings
```

```
                _operator_right_setpoint_psi_b0_ui = _pressure_minimum_psi_b0_ui;
                trim_sw_change_right_setpoint(_operator_right_setpoint_psi_b0_ui);
            }
255
        if( _independant_float_type_b_xp )
        {
260         if( _operator_left_setpoint_psi_b0_ui < _pressure_minimum_psi_b0_ui )  // Test for above-minimum trim settings
            {
                _operator_left_setpoint_psi_b0_ui = _pressure_minimum_psi_b0_ui;
                trim_sw_change_left_setpoint(_operator_left_setpoint_psi_b0_ui);
            }
        }
265     _last_push_was_header_raise_b0_uc = FALSE;              // clr flag // First test if this was the first hdr lower push
270     if( _this_is_the_first_header_lower_push_b0_uc )
        {
            _this_is_the_first_header_lower_push_b0_uc = FALSE;
            _hdr_normal_state_b0_ui = CHARGE_ACCUM_1;
        }
275     else
        {
            HSD_hydr_master_on_b_xp = TRUE;
            _hdr_normal_state_b0_ui = LOWER_1;
        }
280     break;
        case CHARGE_ACCUM_1:

285     HSD_hydr_master_on_b_xp = TRUE;

// Hit proportional valve with float value
        Flotation_left_desired_psi_b0_ui = _operator_left_setpoint_psi_b0_ui;
        Flotation_right_desired_psi_b0_ui = _operator_right_setpoint_psi_b0_ui;

290     if( ++_timer1_b0_ui >= _time_b0_ui2scans_sec_f( 0.32 ) )   // if we're here for .32 second
        {
            _timer1_b0_ui = accumulator_charging_time_b0_ui( engine_v_eng_rpm_b0.filtered );   // clr the t
            _hdr_normal_state_b0_ui = CHARGE_ACCUM_2;              // go to the next state
```

Fig. 9

```
295     if( hdr_raise_debounced_bt )                                    // if he pushed the Header Raise
        {
300         _this_is_the_first_header_lower_push_b0_uc = TRUE;          // has to come back here
            _hdr_normal_state_b0_ui = CHECK_SWITCHES;                   // go back to get restarted
        }

OnDemand_add_message( od_message_32 );                          // display charging accumulator message on lines 1 & 2

305     break;

case CHARGE_ACCUM_2:

310     HSD_hydr_master_on_b_xp = TRUE;
        Header_lower_sol = 1;                                           // turn solenoids B F on // Hit proportional valve with float value
        Flotation_left_desired_psi_b0_ui = _operator_left_setpoint_psi_b0_ui;
        Flotation_right_desired_psi_b0_ui = _operator_right_setpoint_psi_b0_ui;

315     if( !( _timer1_b0_ui % _time_b0_ui2scans_sec_l(( 5.00 ))))      // refresh the message at 5, 10, 15 seconds to go
            OnDemand_add_message( od_message_32 );                      // display charging accumulator message on lines 1 & 2

320     if( ! -- _timer1_b0_ui )                                        // if we're here for the required time
        {
            _hdr_normal_state_b0_ui = CHECK_SWITCHES;                   // go back to get restarted
        } if( hdr_raise_debounced_bt )                                    // if he pushed the Header Raise
        {
325         _this_is_the_first_header_lower_push_b0_uc = TRUE;          // has to come back here
            _hdr_normal_state_b0_ui = CHECK_SWITCHES;                   // go back to get restarted
        }

330     break;

case LOWER_1:

335     HSD_hydr_master_on_b_xp = TRUE;

// Hit proportional valve with new float value less the offset
```

Fig. 10

```
             Flotation_right_desired_psi_b0_ui = _operator_right_setpoint_psi_b0_ui + _pressure_offset_psi_b0_si;
         if( _independant_float_type_b_xp )                  // if we have independant flotation
340          Flotation_left_desired_psi_b0_ui = _operator_left_setpoint_psi_b0_ui + _pressure_offset_psi_b0_si;

Flotation_display_float_settings();                 // display on demand 345      if( ++_timer1_b0_ui >= _time_b0_ui2scans_sec_f( 0.32 ) )    // if we're here for 1/4 second
         {
             _timer1_b0_ui = 0;                              // clr the timer
             _hdr_normal_state_b0_ui = LOWER_2;              // go to the next state
         }

350      if( hdr_raise_debounced_bt )                        // if he pushed the Header Raise
             _hdr_normal_state_b0_ui = CHECK_SWITCHES;       // go back to get restarted break;

355  case LOWER_2:
         HSD_hydr_master_on_b_xp = TRUE;
         Header_lower_sol = 1;                               // turn solenoids B F on
         Header_float_sol = 1;                               // turn solenoids C G on // Hit proportional valve with new float value less the offset
360      Flotation_right_desired_psi_b0_ui = _operator_right_setpoint_psi_b0_ui + _pressure_offset_psi_b0_si;
         if( _independant_float_type_b_xp )                  // if we have independant flotation
             Flotation_left_desired_psi_b0_ui = _operator_left_setpoint_psi_b0_ui + _pressure_offset_psi_b0_si;

365      if( ++_timer1_b0_ui >= _pressure_offset_sec_b0_ui ) // if we're here for 2 seconds
         {
             _timer1_b0_ui = 0;                              // clr the timer
370          _hdr_normal_state_b0_ui = LOWER_3;              // go to the next state
         } if( hdr_raise_debounced_bt )                        // if he pushed the Header Raise
         {
             _inhibit_trim_adj_b0_uc = 0;                    // allow trim adjust
375          _hdr_normal_state_b0_ui = CHECK_SWITCHES;       // go back to get restarted
         }
```

Fig. 11

```
380        Flotation_display_float_settings();              // display on demand break;

case LOWER_3:

385        HSD_hydr_master_on_b_xp = TRUE;
           Header_lower_sol = 1;                            // turn solenoids B F on
           Header_float_sol = 1;                            // turn solenoids C G on // Hit proportional valve with new float value
390        Flotation_left_desired_psi_b0_ui = _operator_left_setpoint_psi_b0_ui;
           Flotation_right_desired_psi_b0_ui = _operator_right_setpoint_psi_b0_ui;

if( ++_timer1_b0_ui >= _time_b0_ui2scans_sec_f( 1.5 ) )   // if we're here for 1 1/2 seconds
           {
395            _timer1_b0_ui = 0;                           // clr the timer
               _hdr_normal_state_b0_ui = LOWER_4;           // go to the next state
           }

400        if( hdr_raise_debounced_bt )                     // if he pushed the Header Raise
           {
               _inhibit_trim_adj_b0_uc = 0;                 // allow trim adjust
               _hdr_normal_state_b0_ui = CHECK_SWITCHES;    // go back to get restarted
           }

405        if( lf_trim_incr_debounced                       // either L incr
               || lf_trim_decr_debounced                    // or L decr
               || rt_trim_incr_debounced                    // or R incr
               || rt_trim_decr_debounced )                  // or R decr
           {
410            _inhibit_trim_adj_b0_uc = 0;                 // allow trim adjust
               _hdr_normal_state_b0_ui = CHECK_SWITCHES;    // don't need to go to remaining states
           }

415        break;

case LOWER_4:

420        HSD_hydr_master_on_b_xp = TRUE;
           Header_float_sol = 1;                            // turn solenoids C G on
```

Fig. 12

```
        if( ++_timer1_b0_ui >= _time_b0_ui2scans_sec_f( 0.25 ) )    // if we're here for 1/4 second
        {
425         _inhibit_trim_adj_b0_uc =0;                              // allow trim adjust
            _hdr_normal_state_b0_ui = LOWER_5;                       // don't need to go to remaining states
        } break;

430 case LOWER_5:

Header_float_sol = 1;                                        // turn solenoids C G on 435     if( _hdr_raise_debounced_bt                                  // header raise
            || _hdr_lower_debounced_bt                               // header lower
        )
        {
            _inhibit_trim_adj_b0_uc = 1;                             // disallow trim adjust
            Trim_state_reset_state_machine();
440         _hdr_normal_state_b0_ui = CHECK_SWITCHES;                // go to begining state
        } break;

case RAISE_1:

445     if( !_timer1_b0_ui )                                         // if first time in
        {
            Flotation_right_desired_psi_b0_ui = 0;                   // so we don't rob oil from lift cylinders 450         if( _independant_float_type_b_xp )                       // and if we have independant flotation
                Flotation_left_desired_psi_b0_ui = 0;                // do tha left side
        }

HSD_hydr_master_on_b_xp = TRUE;

455     if( ++_timer1_b0_ui >= _time_b0_ui2scans_sec_f( 0.32 ) )     // if we're here for .32 second
            _hdr_normal_state_b0_ui = RAISE_2;                       // go to the next state if( !hdr_raise_debounced_bt )                                // if he pushed the Header Raise
        {
460         _hdr_normal_state_b0_ui = CHECK_SWITCHES;                // go back to get restarted
```

Fig. 13

```
    }
    break;

case RAISE_2:

465 HSD_hydr_master_on_b_xp = TRUE;
    Header_raise_sol = 1;                              // turn solenoids D H on 470 if( lhdr_raise_debounced_bt )                      // if he stopped the header raise
    {
        _timer1_b0_ui = 0;                             // clr the timer
475     _hdr_normal_state_b0_ui = RAISE_3;             // go to the next state
    }
    break;

case RAISE_3:

480 HSD_hydr_master_on_b_xp = TRUE;

if( ++_timer1_b0_ui >= _time_b0_ui2scans_sec_f( 0.25 ) )    // if we're here for 1/4 second
    {
485     Flotation_right_desired_psi_b0_ui = DEFAULT_MIN_PRESSURE_psi_b0_ui;   // get back close to desired setting if( _independant_float_type_b_xp )             // and if we have independant flotation
            Flotation_left_desired_psi_b0_ui = DEFAULT_MIN_PRESSURE_psi_b0_ui;// do the same for the left _inhibit_trim_adj_b0_uc = 0;                   // allow trim adjust
490     _hdr_normal_state_b0_ui = CHECK_SWITCHES;      // that's long enough, go back to start
    }

495 if( hdr_raise_debounced_bt )                       // if he pushed the Header Raise again
        _hdr_normal_state_b0_ui = RAISE_2;             // go back a step break;
    }

500 if( !_independant_float_type_b_xp                  // if we have non-independant flotation and we saw a left trim switch
    // && _LH_compensation_installed_b0_uc             // we are using LH PRV on an economy machine
    )
    Flotation_left_desired_psi_b0_ui = _operator_left_setpoint_psi_b0_ui;   // always hit the counter weight PRV
```

Fig. 14

```
505   // EXECUTE TRIM STATE MACHINE IF NOT INHIBITED
      if( _inhibit_trim_adj_b0_uc                              //  if Trim adjust is disallowed
         || _last_push_was_header_raise_b0_uc                  // OR if last push was hdr raise
         || _this_is_the_first_header_lower_push_b0_uc         // OR header hasn't been lowered once yet
         )
510      Trim_state_machine();                                 // keep state machine at the beginning
      else
         Trim_state_machine_main();                            // else run the state machine 515 /*
      Oct 9, 2004 - Take this offline but keep in the source files for future reinstatement // TEST FOR GOING INTO TRANSPORT MODE - ONLY AVAILABLE ON DELUXE UNITS
520   if( deluxe_model_b_xp )                                  // if not an economy unit
      {
         if( _last_push_was_header_raise_b0_uc                 // hdr last push was raise
            && _gnd_speed_x_ten > _10_MPH_IN_TENTHS  // feb23 2004     // and greater than 10 mph
            && Iomap_digin_swstate_S11_hi_gnd_speed.debounced                 // and in hi-speed
            && !_hdr_emerg_stop_debounced                      // and hdr PTO is off
525      {
            ee_flotation_header_operating_mode_nbl = HDR_TRANSPORT;
            Flotation_state_reset_hdr_normal_state_machine();
            _reset_hdr_remove_state_machine();
530         _reset_hdr_transport_state_machine();
         }
      }
*/
535   break;

/*.............
         HEADER REMOVE MODE
540   ............*/ case HDR_REMOVE:
         _inhibit_trim_adj_b0_uc = TRUE;                       // always disallow trim adjust
         _this_is_the_first_header_lower_push_b0_uc =TRUE;     // queue this for when going back to normal mode
545      Flotation_left_desired_psi_b0_ui = 0;                 // always keep PRV's at zero psi
```

*Fig. 15*

```
              Flotation_right_desired_psi_b0_ui = 0;                    // always keep PRV's at zero psi
              // GET TRIM SWITCH INFORMATION
550           trim_switches_header_remove();

switch( _hdr_remove_state_b0_ui )
              {
                default:
555             case HDR_REMOVE_INIT:
                  // DO I CARE WHETHER HE IS STILL PUSHING THE TRIM SWITCHES WHEN HE GETS HERE??
                  trim_sw_enter_header_remove_mode();                    // go to header remove mode
560               _hdr_remove_state_b0_ui = HDR_REMOVE_LOWER_9;
                  break;
565             case HDR_REMOVE_CHECK_SWITCHES:
                  _timer5_b0_ui = 0;                                     // clr the timer
                  if( hdr_raise_debounced_bt )                           // header raise on
570               {
                    _last_push_was_header_raise_b0_uc = TRUE;            // set flag
                    _hdr_remove_state_b0_ui = HDR_REMOVE_RAISE_1;
                  }
                  else
                  if( hdr_lower_debounced_bt )                           // header lower on
575                 _hdr_remove_state_b0_ui = HDR_REMOVE_LOWER_1;
                  break;
                case HDR_REMOVE_LOWER_1:
                  OnDemand_add_message( od_message_37 );                 // 2-line "NOTE: NO FLOTATION!" "PUSH AGAIN TO LOWE
580               Alarm_OneShot_1sec();
                  _hdr_remove_state_b0_ui = HDR_REMOVE_LOWER_2;          // go to the next state
585               break;
                case HDR_REMOVE_LOWER_2:
```

Fig. 16

```
590     if( !hdr_lower_debounced_bt )              // when he stops pushing header lower,
            _hdr_remove_state_b0_ui = HDR_REMOVE_LOWER_3;        // go to the next state break;

595     case HDR_REMOVE_LOWER_3:

600     if( ++_timer5_b0_ui >= _time_b0_ui2scans_sec_f( 5.00 ) )   // if we're here for 5 seconds
            _hdr_remove_state_b0_ui = HDR_REMOVE_CHECK_SWITCHES;  // go to the next state
        if( hdr_raise_debounced_bt )              // header raise on
        {
            _last_push_was_header_raise_b0_uc = TRUE;    // set flag
            HSD_hydr_master_on_b_xp = TRUE;
605         _hdr_remove_state_b0_ui = HDR_REMOVE_RAISE_1;
        }
        if( hdr_lower_debounced_bt )              // if header lower on
        {
610         _timer5_b0_ui = 0;                    // clr the timer
            HSD_hydr_master_on_b_xp = TRUE;
            _hdr_remove_state_b0_ui = HDR_REMOVE_LOWER_4;        // go and lower the header
        }
615     break;

case HDR_REMOVE_LOWER_4:
            HSD_hydr_master_on_b_xp = TRUE;

620     if( ++_timer5_b0_ui >= _time_b0_ui2scans_sec_f( 0.32 ) )   // if we're here for 1/4 second
            _hdr_remove_state_b0_ui = HDR_REMOVE_LOWER_5;         // go to the next state
        if( !hdr_lower_debounced_bt )             // if stopped pushing header lower
        {
625         _hdr_remove_state_b0_ui = HDR_REMOVE_CHECK_SWITCHES;  // go back to get restarted
        }
630     break;
```

Fig. 17

```
      case HDR_REMOVE_LOWER_5:

HSD_hydr_master_on_b_xp = TRUE;
635     Header_lower_sol = 1;                                      // turn solenoids B F on
        Header_float_sol = 1;                                      // turn solenoids C G on if( !hdr_lower_debounced_bt )                              // if stopped pushing header lower
        {
640       if( park_brake_status_off_bt_xp )
          {
            _hdr_remove_state_b0_ui = HDR_REMOVE_CHECK_SWITCHES;   // go back to get restarted
          }
          else
          {
            _timer5_b0_ui = 0;                                     // clr the timer
645         _hdr_remove_state_b0_ui = HDR_REMOVE_LOWER_6;          // go back to get restarted
          }
        }
650   break;

case HDR_REMOVE_LOWER_6:

HSD_hydr_master_on_b_xp = TRUE;
655     Header_lower_sol = 1;                                      // turn solenoids B F on
        Header_float_sol = 1;                                      // turn solenoids C G on if( hdr_tilt_extend_debounced_bt )                         // header tilt extend (down) on
        {
          _timer4_b0_ui = 0;                                       // clr the timer
660       _hdr_remove_state_b0_ui = HDR_REMOVE_LOWER_7;            // do this to stop the master valve & allow tilt
        } ifdef DISTINCT_FLOTATION_EE_LOCATIONS_FOR_HEADER_TYPES            //rlf2005jun03
665   if
      ( ( ++_timer5_b0_ui > _time_b0_ui2scans_sec_f( 300.0 ) )     //  if we're here for 5 minutes
        || hdr_raise_debounced_bt                                  // OR header raise on
        || park_brake_status_off_bt_xp                             // OR if park brake is off
        || rt_trim_incr_debounced                                  // OR if pushing right trim switch
670     || ( _independant_float_type_b_xp && lf_trim_incr_debounced )  // OR pushing left trim switch on a 6cyl
      )
```

Fig. 18

```
         _hdr_remove_state_b0_ui = HDR_REMOVE_CHECK_SWITCHES;
675     }
     #else
     if
680     ( (++_timer5_b0_ui > _time_b0_ui2scans_sec_f( 300.0 ) )   //  if we're here for 5 minutes
        || hdr_raise_debounced_bt                                 // OR header raise on
        || park_brake_status_off_bt_xp                            // OR if park brake is off
        || lf_trim_incr_debounced                                 // OR if pushing a trim switch
        || rt_trim_incr_debounced                                 // OR if pushing a trim switch
     )
685     {
         _hdr_remove_state_b0_ui = HDR_REMOVE_CHECK_SWITCHES;
     }
690  #endif
     break;
     case HDR_REMOVE_LOWER_7:
695     if( ++_timer4_b0_ui > _time_b0_ui2scans_sec_f( 0.33 ) )    // if we're here for 1/3 second
        {
         _timer4_b0_ui = 0;                          // clr the timer
700     _hdr_remove_state_b0_ui = HDR_REMOVE_LOWER_8;              // go to the next state
        }
     break;
     case HDR_REMOVE_LOWER_8:
705  if( !hdr_tilt_extend_debounced_bt )                           // header tilt extend (down) no longer on
     if( ( ++_timer4_b0_ui > _time_b0_ui2scans_sec_f( 0.33 ) )     // and if been off switch for 1/3 second
         _hdr_remove_state_b0_ui = HDR_REMOVE_LOWER_6;             // go back and finish the timer
     if( hdr_raise_debounced_bt )                                  // if pushing header raise
710     {
         _hdr_remove_state_b0_ui = HDR_REMOVE_CHECK_SWITCHES;
        }
```

Fig. 19

```
715   break;
      case HDR_REMOVE_LOWER_9:
      HSD_hydr_master_on_b_xp = TRUE;
720   if( draper_header_installed_b_xp )                      // need to shift the selector valve first before hitting the master
      {
          LSD_ON_MACRO( iomap_LSDout_K54_lf_hdr_cut_height );
          LSD_ON_MACRO( iomap_LSDout_K56_rt_hdr_cut_height );
725   }
      if( hsd_hydr_master_full_on_b_xp() )                    // wait for master to be fully energized
      {
          _timer5_b0_ui = 0;                                  // clr the timer
730       _hdr_remove_state_b0_ui = HDR_REMOVE_LOWER_10;      // go to the next state
      }
      break;
735   case HDR_REMOVE_LOWER_10:
      HSD_hydr_master_on_b_xp = TRUE;
      Header_lower_sol = 1;                                   // turn solenoids B F on
      Header_float_sol = 1;                                   // turn solenoids C G on
740   if( draper_header_installed_b_xp )
      {
          LSD_ON_MACRO( iomap_LSDout_K54_lf_hdr_cut_height );
          LSD_ON_MACRO( iomap_LSDout_K56_rt_hdr_cut_height );
745   }
      if( ++_timer5_b0_ui >= _time_b0_ui2scans_sec_l( 3.0 ) ) // if we're here for 3 seconds
      {
          if( park_brake_status_off_bt_xp )
750       {
              _hdr_remove_state_b0_ui = HDR_REMOVE_CHECK_SWITCHES;   // go back to get restarted
          }
          else
          {
755   #ifdef DISTINCT_FLOTATION_EE_LOCATIONS_FOR_HEADER_TYPES                    //rlf2005jun03
```

Fig. 20

```
760         if
            (!( !_rt_trim_incr_debounced                              // if not       //    pushing the right trim incr
              || (_independant_float_type_b_xp && !f_trim_incr_debounced) //           OR the left trim incr if a 6cyl
              )
            ){
765           _timer5_b0_ui = 0;                          // clr the timer
              _hdr_remove_state_b0_ui = HDR_REMOVE_LOWER_6;            // go back to get restarted
            }
      #else
770         if( !(!f_trim_incr_debounced || rt_trim_incr_debounced) )  // if not pushing a trim switch
            {
              _timer5_b0_ui = 0;                          // clr the timer
              _hdr_remove_state_b0_ui = HDR_REMOVE_LOWER_6;            // go back to get restarted
            }
775   #endif
            }
780         break;

case HDR_REMOVE_RAISE_1:
            HSD_hydr_master_on_b_xp = TRUE;

785         if( ++_timer5_b0_ui >= _time_b0_ui2scans_sec_f(0.32) )     // if we're here for 1/4 second
              _hdr_remove_state_b0_ui = HDR_REMOVE_RAISE_2;            // go to the next state if( !hdr_raise_debounced_bt )                              // if he stopped the header raise
790           _hdr_remove_state_b0_ui = HDR_REMOVE_CHECK_SWITCHES;
            break;

case HDR_REMOVE_RAISE_2:
795         HSD_hydr_master_on_b_xp = TRUE;
            Header_raise_sol = 1;                          // turn solenoids D H on
            Header_lower_sol = 1;                          // turn solenoids B F on
```

*Fig. 21*

```
800     if( !hdr_raise_debounced_bt )                      // if he stopped the header raise
        {
            _timer5_b0_ui = 0;                             // clr the timer
            _hdr_remove_state_b0_ui = HDR_REMOVE_RAISE_3;  // go to the next state
        }
805     break;

case HDR_REMOVE_RAISE_3:

810         HSD_hydr_master_on_b_xp = TRUE;

if( ++_timer5_b0_ui >= _time_b0_ui2scans_sec_f( 0.25 ) )   // if we're here for 1/4 second
                _hdr_remove_state_b0_ui = HDR_REMOVE_CHECK_SWITCHES;   // that's long enough, go back to start
815         if( hdr_raise_debounced_bt )                   // if he pushed the Header Raise again
                _hdr_remove_state_b0_ui = HDR_REMOVE_RAISE_2;          // go back a step 820     break;
        case HDR_REMOVE_EXIT_1:

// GOING BACK TO NORMAL MODE
            _timer5_b0_ui = 0;                             // reset the timer
            _hdr_remove_state_b0_ui = HDR_REMOVE_EXIT_2;   // go to next state
825     break;

case HDR_REMOVE_EXIT_2:

830     if( ++_timer5_b0_ui >= _time_b0_ui2scans_sec_f( 4.00 ) )   // if we're here for 5 seconds
            _hdr_remove_state_b0_ui = HDR_REMOVE_EXIT_3;           // that's long enough, go to next state if( rt_trim_incr_debounced                     // but if still playing with any of these switches
835         || rt_trim_decr_debounced
            || lf_trim_incr_debounced
            || lf_trim_decr_debounced
            )
            {
                _timer5_b0_ui = 0;                         // reset the timer
840             OnDemand_add_message( od_message_36 );
```

Fig. 22

```
                )
        break;
845     case HDR_REMOVE_EXIT_3:
        ee_flotation_header_operating_mode_nbl = HDR_NORMAL;    // this will call Trim_switches_init() which will reload the ee values into the
        flotation_state_machine_init();
850     break;
        )
855     break;
/*****************
        HEADER TRANSPORT MODE
*****************/
860     Oct 9, 2004 - Take this offline but keep in the source files for future reinstatement
        case HDR_TRANSPORT:
865     _inhibit_trim_adj_b0_uc = 1;                            // always disallow a Trim adjust
        switch( _transport_state_b0_ui )
        {
        default:
870     case TRANSPORT_INIT:
        _timer2_b0_ui = 0;                                      // clr the timer
        _transport_state_b0_ui = TRANSPORT_1;                   // go to the next state
875     break;
        case TRANSPORT_1:       // FIRST GET THE ACCUMULATORS UP TO MAX
        HSD_hydr_master_on_b_xp = TRUE;
880     Header_lower_sol = 1;                                   // turn solenoids B F on
        // Hit proportional valve with the transport float value
```

Fig. 23

```
         Flotation_left_desired_psi_b0_ui = TRANSPORT_PRESSURE_psi_b0_ui;
         Flotation_right_desired_psi_b0_ui = TRANSPORT_PRESSURE_psi_b0_ui;

885   // longer period of time in case we came here from header remove mode
      if( ++_timer2_b0_ui >= _time_b0_ul2scans_sec_f( 9.00 ) )    // if we're here for 9 seconds
      {
         _timer2_b0_ui = 0;                    // clr the timer
890      _transport_state_b0_ui = TRANSPORT_2;           // go to the next state
      } break;

895   case TRANSPORT_2:   // OPEN THE ACCUMULATORS TO THE LIFT CYLINDER

HSD_hydr_master_on_b_xp = TRUE;
         Header_lower_sol = 1;                 // turn solenoids B F on
         Header_float_sol = 1;                 // turn solenoids C G on // Hit proportional valve with the transport float value
900      Flotation_left_desired_psi_b0_ui = TRANSPORT_PRESSURE_psi_b0_ui;
         Flotation_right_desired_psi_b0_ui = TRANSPORT_PRESSURE_psi_b0_ui;

905   if( ++_timer2_b0_ui >= _4sec )           // if we're here for 2 seconds
      {
         HSD_hydr_master_on_b_xp = TRUE;
         _transport_state_b0_ui = TRANSPORT_3;           // go to the next state
      }

910   break;

915   case TRANSPORT_3:   // OPEN THE ACCUMULATORS TO THE LIFT CYLINDER

Header_float_sol = 1;                 // turn solenoids C G on

// Hit proportional valve with the transport float value
         Flotation_left_desired_psi_b0_ui = TRANSPORT_PRESSURE_psi_b0_ui;
         Flotation_right_desired_psi_b0_ui = TRANSPORT_PRESSURE_psi_b0_ui;

920   break;
      }

// TEST FOR GOING BACK TO NORMAL MODE
```

Fig. 24

```
925  if( hdr_lower_debounced_bt                          // header lower switch being pushed
       || _gnd_speed_x_ten < _5_MPH_IN_TENTHS           // or less than 5 mph
       || iomap_digin_swstate_S11_hi_gnd_speed.debounced // or not in hi-speed
       || _hdr_emerg_stop_debounced                     // or hdr PTO is not off
930    )
       {
         ee_flotation_header_operating_mode_nbl = HDR_NORMAL;
         Flotation_state_reset_hdr_normal_state_machine();
935      _reset_hdr_remove_state_machine();
         _reset_hdr_transport_state_machine();
       }
940    break;
       /
945  /********************************************************/
     static void _reset_header_operating_mode_state_machine( void )
     {
       ee_flotation_header_operating_mode_nbl = HDR_WAKEUP;
950  }
     /********************************************************/
     static void _reset_hdr_remove_state_machine( void )
955  {
       _hdr_remove_state_b0_ui = HDR_REMOVE_INIT;
     }
960  /********************************************************/
     static void _set_hdr_remove_state_machine_when_waking_up_in_romove_mode( void )
     {
       _hdr_remove_state_b0_ui = HDR_REMOVE_CHECK_SWITCHES;
965  }
```

Fig. 25

```c
/*************************************************/
// Oct 9, 2004 - Take this offline but keep in the source files for future reinstatement
static void _reset_hdr_transport_state_machine( void )
970 {
    _transport_state_b0_ui = TRANSPORT_INIT;
},
975 /*************************************************/
void Flotation_state_reset_hdr_normal_state_machine( void )
{
    _hdr_normal_state_b0_ui = CHECK_SWITCHES;
980 #ifdef DISTINCT_FLOTATION_EE_LOCATIONS_FOR_HEADER_TYPES        //rlf2005jun03
    if( draper_header_installed_b_xp )
        _pressure_offset_psi_b0_si = (signed int)(*(unsigned int *)(_draper_header_drop_press_idv._idv))+_draper_header_drop_press_idv._offset;
    else
985    if( sickle_header_installed_b_xp )
        _pressure_offset_psi_b0_si = (signed int)(*(unsigned int *)(_sickle_header_drop_press_idv._idv))+_sickle_header_drop_press_idv._offset;
    else        // only thing left is a disc head and they only run on a 6cyl with independant flotation
        _pressure_offset_psi_b0_si = (signed int)(*(unsigned int *)(_disc_header_drop_press_idv._idv))+_disc_header_drop_press_idv._offset;
990 #else
    _pressure_offset_psi_b0_si = (signed int)(*(unsigned int *)(_header_drop_press_idv._idv))+_header_drop_press_idv._offset;
#endif
}
995 /*************************************************/
void Flotation_state_update_left_setpoint( unsigned int operator_left_setpoint_b0_ui )
{
1000    if( _independant_float_type_b_xp )              // if we have independant flotation
        _operator_left_setpoint_psi_b0_ui =
            _PRESSURE_STEP_CHANGE_psi_b0_ui * _operator_left_setpoint_b0_ui;       // 10 * 0 thru 340 == 0 thru 3400
    else                                              // else this is for the counterweight
        _operator_left_setpoint_psi_b0_ui =
1005        (unsigned int)(
            ((unsigned long)_PRESSURE_STEP_CHANGE_psi_b0_ui)        // 10 *
```

*Fig. 26*

```
1010                           * CONV_FACTOR_PERCENT_TO_PRESSURE_units_b14_ui    // 55705 *
                               * _operator_left_setpoint_b0_ui
                               / BIN14                      // 0 thru 100 == 0 thru 55,705,000
                             );                             // 16384 == 0 thru 3399.96 == 0 thru 3399
1015    /*******************************************************/
        void Flotation_state_update_right_setpoint( unsigned int _operator_right_setpoint_b0_ui )
        {
1020        _operator_right_setpoint_psi_b0_ui =
                PRESSURE_STEP_CHANGE_psi_b0_ui * _operator_right_setpoint_b0_ui;    // 10 * 0 thru 340 == 0 thru 3400
        }
        /*******************************************************/
1025    unsigned int Flotation_state_left_setpoint_psi_b0_ui( void )
        {
            return( _operator_left_setpoint_psi_b0_ui );
        }
1030    /*******************************************************/
        unsigned int Flotation_state_left_counterweight_setpoint_pc_b0_ui( void )
        {
            return
1035        (
                (unsigned int)
                (
                    ((unsigned long)_operator_left_setpoint_psi_b0_ui) * BIN10    // 0 thru 3400 * 1024 == 0 thru 3481600
                    / CONV_FACTOR_PRESSURE_TO_PERCENT_units_b10_ui                // // 34816      == 0 thru 100
1040        )
            );
        }
1045    /*******************************************************/
        unsigned int Flotation_state_right_setpoint_psi_b0_ui( void )
        {
            return( _operator_right_setpoint_psi_b0_ui );
1050    }
```

Fig. 27

```c
/*************************************************/
      unsigned int Flotation_hdr_normal_state_status_b0_ui( void )
      {
1055    return( _hdr_normal_state_b0_ui );
      }
/*************************************************/
1060  unsigned int Flotation_hdr_operating_mode_status_b0_ui( void )
      {
        return( (unsigned int)ee_flotation_header_operating_mode_nbl );
      }
1065
/*************************************************/
      unsigned char Flotation_last_push_was_header_raise_status_b0_uc( void )
      {
        return( _last_push_was_header_raise_b0_uc );
1070  }
/*************************************************/
      void flotation_exit_from_header_remove_mode( void )
1075  {
        _hdr_remove_state_b0_ui = HDR_REMOVE_EXIT_1;
      }
1080  /*************************************************/
      void flotation_enter_into_header_remove_mode( void )
      {
        if( ee_flotation_header_operating_mode_nbl != HDR_REMOVE )   // this prevents the message when waking up in header remove mode
1085      OnDemand_add_message( od_message_35 );                      // "*ENTERING HDR" "*REMOVAL MODE"

ee_flotation_header_operating_mode_nbl = HDR_REMOVE;
        _hdr_remove_state_b0_ui = HDR_REMOVE_INIT;
1090  }
```

Fig. 28

```
/*··················································*/
       unsigned int Flotation_hdr_remove_state_status_b0_ui( void )
1095 {
       return(_hdr_remove_state_b0_ui );
       }
1100 /*··················································*/
       void Flotation_display_float_settings( void )
       {
       /*
       Description: message for an Independant (deluxe) machine - display LH float psi on line 1 & RH float psi on line 2
1105 */
       if(_independant_float_type_b_xp )                           // test for independant vs non-independant flotation
          OnDemand_add_message( od_message_31 );                   // display LH float psi on line 1 & RH float psi on line 2
       else
1110   if(_LH_compensation_installed_b0_uc )                       // if using LH PRV on an economy machine
          {
          if( in_header_remove_mode_b_xp )                         // If in header remove mode
             OnDemand_add_message( od_message_01 );                // display only the RH float psi on line 1
          else
1115      OnDemand_add_message( od_message_34 );                   // display counterweight % on line 1 & RH float psi on line 2
          }
       else
          OnDemand_add_message( od_message_01 );                   // display only the RH float psi on line 1
1120   }
       /*··················································*/
       unsigned char Flotation_state_header_lowered_b_xp( void )
1125   {
       return(_hdr_normal_state_b0_ui == LOWER_5 );
       }
1130   /*··················································*/
       void flotation_state_reposition_hdr_normal_state_machine( void )
       {
       _inhibit_trim_adj_b0_uc = 0;                                // allow trim adjust
       _hdr_normal_state_b0_ui = LOWER_5;
```

Fig. 29

```
(1135)   /*******************************************************/
         static unsigned int accumulator_charging_time_b0_ui( unsigned int X )
(1140)   {
         /*
         DESCRIPTION: Accumulator charging time dependant upon engine RPM
                Input value X: engine RPM in velocity_rpm_b0_ui
                Return value : time value in _time_b0_ui2scans_sec_f
(1145)   */
         static const struct UFOX_FN FN[] =
         {
(1150)       { velocity_rpm_b0_ui(    0 ), _time_b0_ui2scans_sec_f( 18.00 ) },
             { velocity_rpm_b0_ui(  799 ), _time_b0_ui2scans_sec_f( 18.00 ) },
             { velocity_rpm_b0_ui(  800 ), _time_b0_ui2scans_sec_f( 15.00 ) },
             { velocity_rpm_b0_ui( 1000 ), _time_b0_ui2scans_sec_f( 13.13 ) },
             { velocity_rpm_b0_ui( 1200 ), _time_b0_ui2scans_sec_f( 11.25 ) },
(1155)       { velocity_rpm_b0_ui( 1400 ), _time_b0_ui2scans_sec_f(  9.38 ) },
             { velocity_rpm_b0_ui( 1600 ), _time_b0_ui2scans_sec_f(  7.50 ) },
             { velocity_rpm_b0_ui( 1800 ), _time_b0_ui2scans_sec_f(  5.63 ) },
             { velocity_rpm_b0_ui( 2000 ), _time_b0_ui2scans_sec_f(  5.00 ) },
             { velocity_rpm_b0_ui( 2200 ), _time_b0_ui2scans_sec_f(  5.00 ) },
(1160)       { velocity_rpm_b0_ui(0xffff), _time_b0_ui2scans_sec_f(  5.00 ) }
         };
         UFOXW_INLINE;
         }
```

Fig. 30

METHOD FOR MANAGING THE ELECTRICAL CONTROL SYSTEM OF A WINDROWER HEADER FLOTATION AND LIFT SYSTEM

This application is a Divisional Application of U.S. patent application Ser. No. 11/486,495 filed Jul. 14, 2006, now U.S. Pat. No. 7,555,883, which is a Continuation-In-Part of Ser. No. 10/822,465, now U.S. Pat. No. 7,168,226, filed Apr. 12, 2004; and claims priority to U.S. Provisional Application No. 60/699,271, filed Jul. 14, 2005; and U.S. Provisional Application No. 60/699,548, filed Jul. 15, 2005.

FIELD OF THE INVENTION

The present invention relates to agricultural harvesting machines, such as windrowers and, more particularly, to a method and system for controlling the operation of a header flotation and lift system for such a machine.

BACKGROUND OF THE INVENTION

U.S. Pat. No. 6,901,729; U.S. patent application Ser. No. 10/822,465, filed Apr. 12, 2004; U.S. Provisional Application No. 60/699,271, filed Jul. 14, 2005; and U.S. Provisional Application No. 60/699,548, filed Jul. 15, 2005, are each incorporated herein by reference in its entirety.

The present invention relates generally to harvesting machines of the type that require flotation systems for permitting their headers to ride lightly up and over rises in the terrain during field operation, and particularly to a hydraulic header lift and flotation system for such a machine that will provide the dual functions of header lift and flotation.

Header flotation systems typically use extension springs, either hydraulically or manually adjusted, bell cranks and other linkages to provide the desired function. The structure generally requires numerous components and large extension springs, and it is quite difficult to develop the mechanical components required to float the broad range of header sizes available even requiring different tractors or frames having their own flotation systems designed to meet their own particular header weight requirements.

Some manufacturers are using an accumulator and hydraulic cylinders to perform the flotation function. These machines typically use separate hydraulic cylinders for the lift and flotation functions, and they lack the capability of independently adjusting the flotation force for each side of the header. Additionally, some headers are not inherently balanced side to side. Special considerations must be made to float and lift these headers evenly by adding ballast, which can become unreasonably heavy or awkward, or modifying the lift geometry of one side.

It would be quite beneficial to have a header lift and flotation system that employs a single hydraulic cylinder for each side of the header, simplifying the controls and mechanical components necessary to perform these functions. It would also be beneficial to have an automatic capability for managing and controlling the hydraulics of the lift and flotation system in several operating modes, including, but not limited to, a wake-up mode where an operation of the system is initiated, including the setting of initial flotation force; a normal mode including wherein conventional operator inputs will be applied for controlling the height of the header and the flotation force; a charge accumulator mode for charging the accumulator or accumulators which provide the flotation capability; a transport mode to put the header into a raised transport mode under certain specific conditions; and a header remove mode which facilitates removal of the header and operation of the flotation system with the header removed.

SUMMARY OF THE DISCLOSURE

Accordingly, it is an object of the present invention is to provide a hydraulic lift and flotation system for the header of a crop harvesting machine that employs a single hydraulic cylinder for each side of the header.

Another object of the present invention is to provide a hydraulic lift and flotation system to be used with both heavy and light headers/conditioners, i.e., a broad range of header sizes and weights.

It is another object of the instant invention to provide a more simplified structure that presents greater flexibility in locating the accumulator as opposed to extension springs and necessary linkages, with fewer pivot points to wear and fewer parts to manufacture and assemble.

It is still another object of the instant invention to provide a flotation and lift system that requires no dealer or customer assembly.

It is an even still further object of the instant invention to provide a hydraulic header flotation and lift system that reduces hydraulic and mechanical shock loading when raising the header in a less than fully raised position, improving the ride comfort for the operator and improving hydraulic and structural durability of the harvester.

It is yet another object of this invention to provide an improved hydraulic header lift and flotation system that is durable in construction, inexpensive of manufacture, carefree of maintenance, facile in assemblage, and simple and effective in use.

It is yet another object of this invention to provide a system and method for managing the electrical control system of a windrower header flotation and lift system that provides several automatically executable operating modes for the flotation and lift system, such as a wake-up mode; a normal mode, which can include float; a charge accumulator mode; a transport mode; and a header remove mode, and the ability to seamlessly and easily transition between the modes, for achieving operational advantages, including improved smoothness and efficiency.

These and other objects are attained by providing a hydraulic lift/flotation system for the header of a crop harvesting machine. Each side of the header is supported by a single cylinder that performs both the flotation and lift functions. The hydraulic lift/flotation system for controlling the cylinders can be of an independent type wherein separate fluid circuitry and valves are provided for controlling each cylinder, or the system can be of a non-independent type, wherein the cylinders are controlled jointly. In this latter instance, to accommodate unbalanced headers (center of gravity not centered between the lift arms), hydraulic oil can be sent to the return side of the lift cylinder on the lighter side of the header, thus resulting in even raising, lowering and float. In the former instance, that is, the independent system, for even lifting and flotation of an unbalanced header, each cylinder has its own control valve, pump, and accumulator, i.e., the left and right systems are generally mirror images of each other, and can be adjusted separately to achieve evenness.

In both instances, that is, for both independent and non-independent systems, the operator sets the desired flotation force by actuating an input device which can be, but is not limited to, a rocker switch, the independent system having two, the non-independent system having one; wherein one switch position allows hydraulic oil to enter an accumulator to reduce header contact force with the ground. The other position allows oil to exit the accumulator to increase header contact force with the ground. With the independent system, to evenly float an unbalanced header, the separate switches adjust each side independently. Once the flotation forces are set, the control valves will return to this preset flotation condition whenever float mode is selected, regardless of subsequent header lift and lower operations.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a schematic of hydraulic, mechanical and electrical sub-systems that cooperate to produce the system of FIGS. 1 and 2.

FIG. 3a is a schematic of hydraulic, mechanical and electrical sub-systems that cooperate to produce the system of FIGS. 1 and 2a.

FIG. 4 is a written listing of steps of a computer program embodying steps of a preferred method of the invention;

FIG. 5 is a written listing of further steps of the preferred program of the invention;

FIG. 6 is a written listing of still further steps of the preferred program of the invention;

FIG. 7 is a written listing of still further steps of the preferred program of the invention;

FIG. 8 is a written listing of still further steps of the preferred program of the invention;

FIG. 9 is a written listing of still further steps of the preferred program of the invention;

FIG. 10 is a written listing of still further steps of the preferred program of the invention;

FIG. 11 is a written listing of still further steps of the preferred program of the invention;

FIG. 12 is a written listing of still further steps of the preferred program of the invention;

FIG. 13 is a written listing of still further steps of the preferred program of the invention;

FIG. 14 is a written listing of still further steps of the preferred program of the invention;

FIG. 15 is a written listing of still further steps of the preferred program of the invention;

FIG. 16 is a written listing of still further steps of the preferred program of the invention;

FIG. 17 is a written listing of still further steps of the preferred program of the invention;

FIG. 18 is a written listing of still further steps of the preferred program of the invention;

FIG. 19 is a written listing of still further steps of the preferred program of the invention;

FIG. 20 is a written listing of still further steps of the preferred program of the invention;

FIG. 21 is a written listing of still further steps of the preferred program of the invention FIG. 22 is a written listing of still further steps of the preferred program of the invention;

FIG. 23 is a written listing of still further steps of the preferred program of the invention;

FIG. 24 is a written listing of still further steps of the preferred program of the invention;

FIG. 25 is a written listing of still further steps of the preferred program of the invention;

FIG. 26 is a written listing of still further steps of the preferred program of the invention;

FIG. 27 is a written listing of still further steps of the preferred program of the invention;

FIG. 28 is a written listing of still further steps of the preferred program of the invention;

FIG. 29 is a written listing of still further steps of the preferred program of the invention;

FIG. 30 is a written listing of still further steps of the preferred program of the invention;

DETAILED DESCRIPTION OF THE PREFERRED EMBODIMENTS

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

Figure 1:
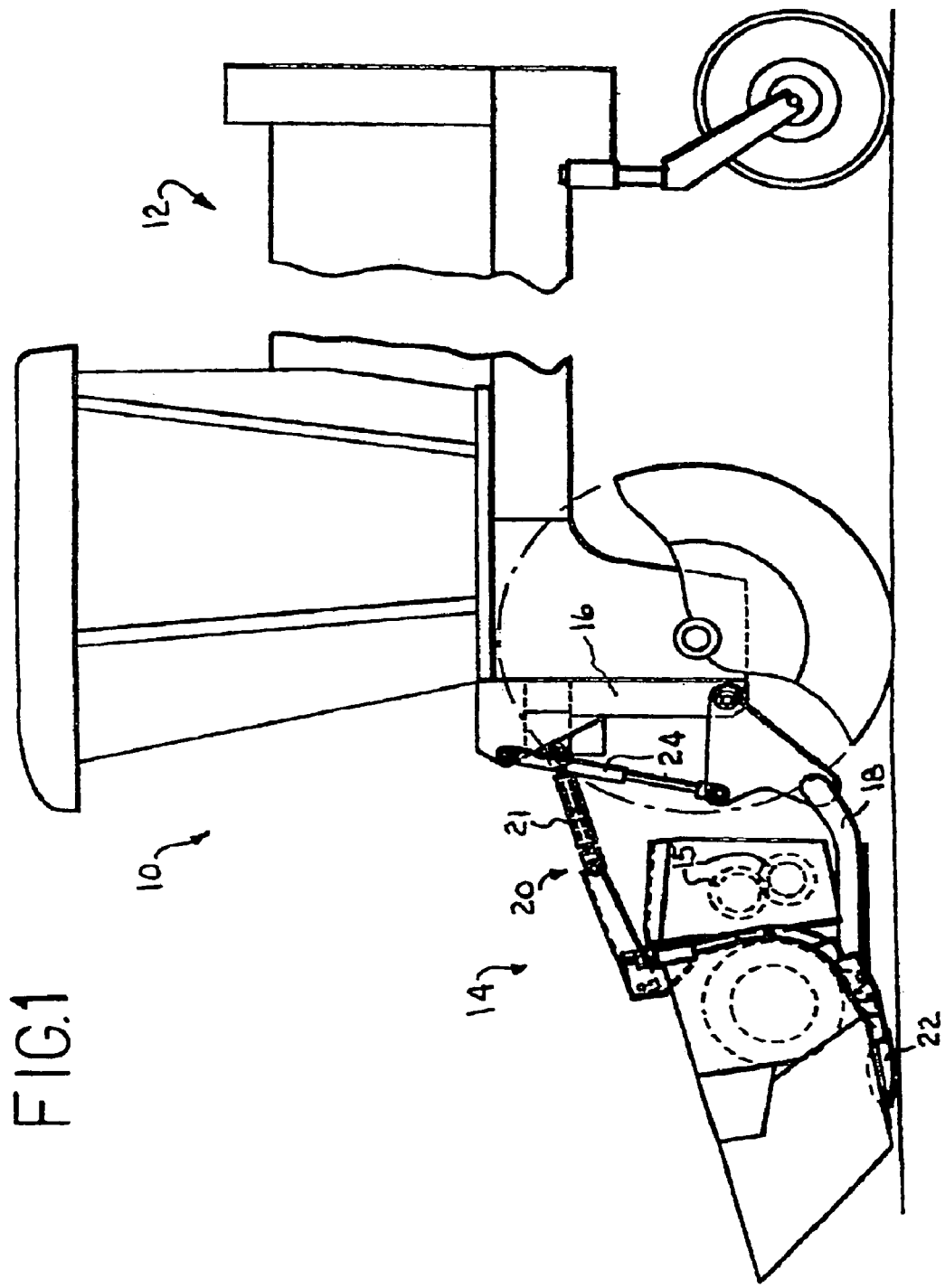
FIG. 1 is a partial side elevational view of a crop harvesting machine of the type with which the invention may be used, also showing a simplified side view of the lift and flotation system of the instant invention.

FIG. 1 shows the present invention utilized in connection with a self-propelled windrower 10; however, it will be appreciated that the principles of the present invention are not limited to a self-propelled windrower, or to any specific type of harvesting machine.

In the illustrated embodiment, the self-propelled windrower 10 comprises a tractor 12 and a header 14, the header 14 being attached to the front end of the frame 16 or chassis of the tractor 12. The header may be of generally any suitable construction and design, and may include not only crop-harvesting mechanisms, but also crop conditioners such as elongate rolls 15. Such attachment of the header 14 to the frame 16 is achieved through a pair of lower arms 18 (only the left one being shown, the right being generally the same) pivoted at one end to the frame 16 and at the other end to the header 14, as well as through a central upper link 20. The link 20 may take the form of a single double-acting hydraulic cylinder 21 whose extension and retraction is controlled by the operator to remotely control the angle of sickle bar 22 on the lower front of the header 14.

A single lift/flotation cylinder 24, 26 interconnecting the lower arm 18 and the frame 16 supports each side of the header, i.e., each side of the header is supported by its own lift/flotation cylinder (again, only the left cylinder 24 being shown in FIG. 1, the right cylinder 26 being visible in FIGS. 32, 33, 34, 35 and 36).

Figure 36:
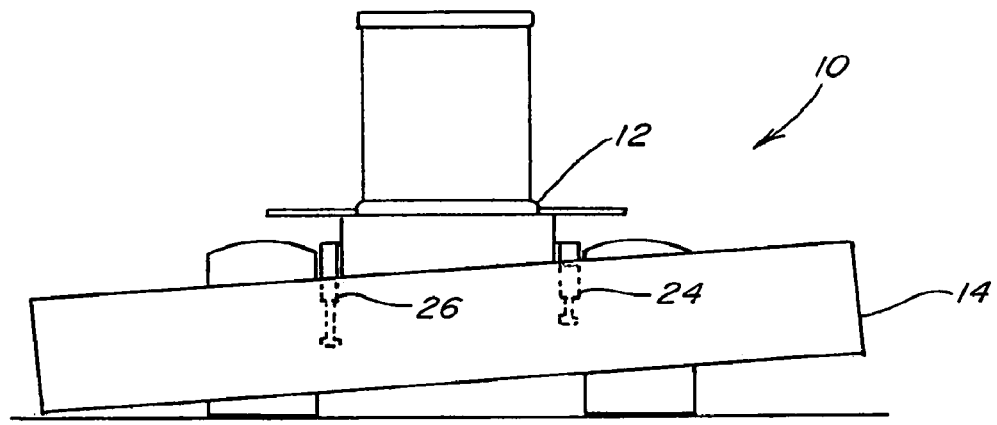
FIG. 36 is another simplified front view of the machine of FIG. 1, with the header tilted in another direction.
Figure 35:
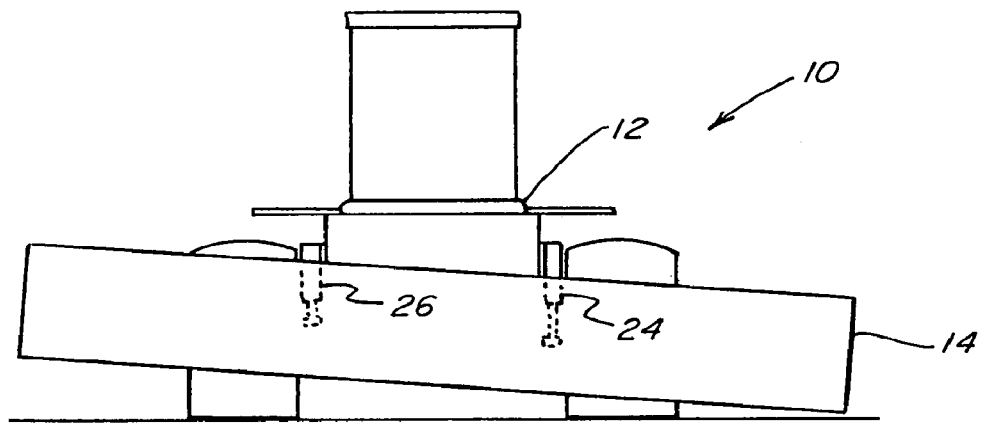
FIG. 35 is another simplified front view of the machine of FIG. 1, with the header tilted in one direction.

The method and system of the invention are configured and adapted for managing and controlling the operation of the lift and flotation functions that control the lift/flotation cylinders. This is done jointly for the cylinders on the opposite sides of the machine in the instance of a non-independent system, and separately, but simultaneously if desired, for the independent system. More specifically, the control system accomplishes two generally separate control functions, one for the right side lift/flotation cylinder and one for the left, and in the non-independent system only one control system is used, but in the independent system, there are actually two control subsystems, one generally the operational mirror image of the other. FIGS. 35 and 36 illustrate an advantage of the independent system which is an ability to control cylinders 24 and 26 of windrower 10 to extend and retract by different extents, for effecting tilting of header 14 relative to tractor 12, in either sideward direction, to a desired extent. In actuality, the two systems may be totally separate, or they may share some operational components and a similar cylinder structure.

Figure 2:
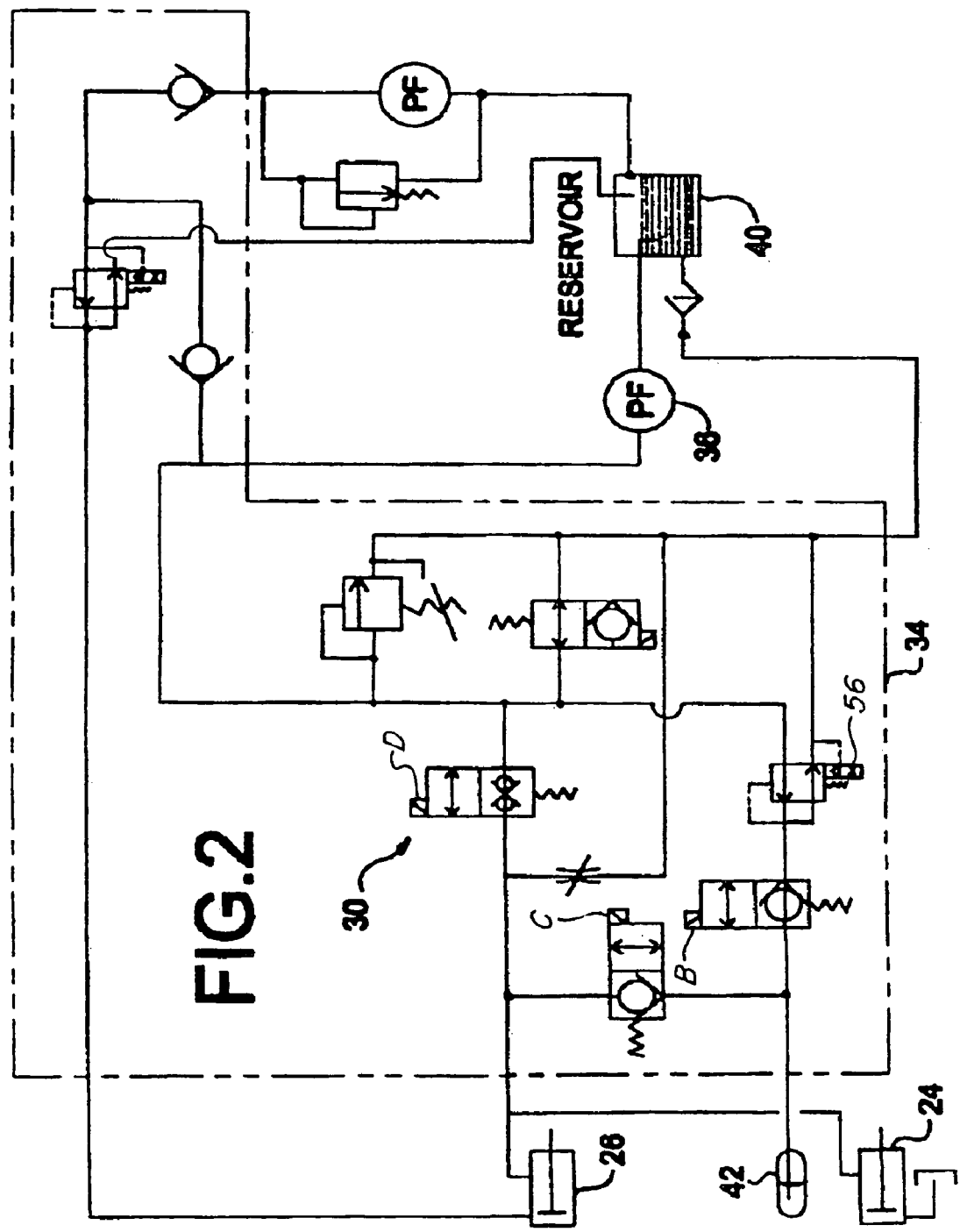
FIG. 2 is a hydraulic schematic view of one embodiment of a hydraulic system with which the instant invention can be used, which is an example of a non-independent system.
Figure 2A:
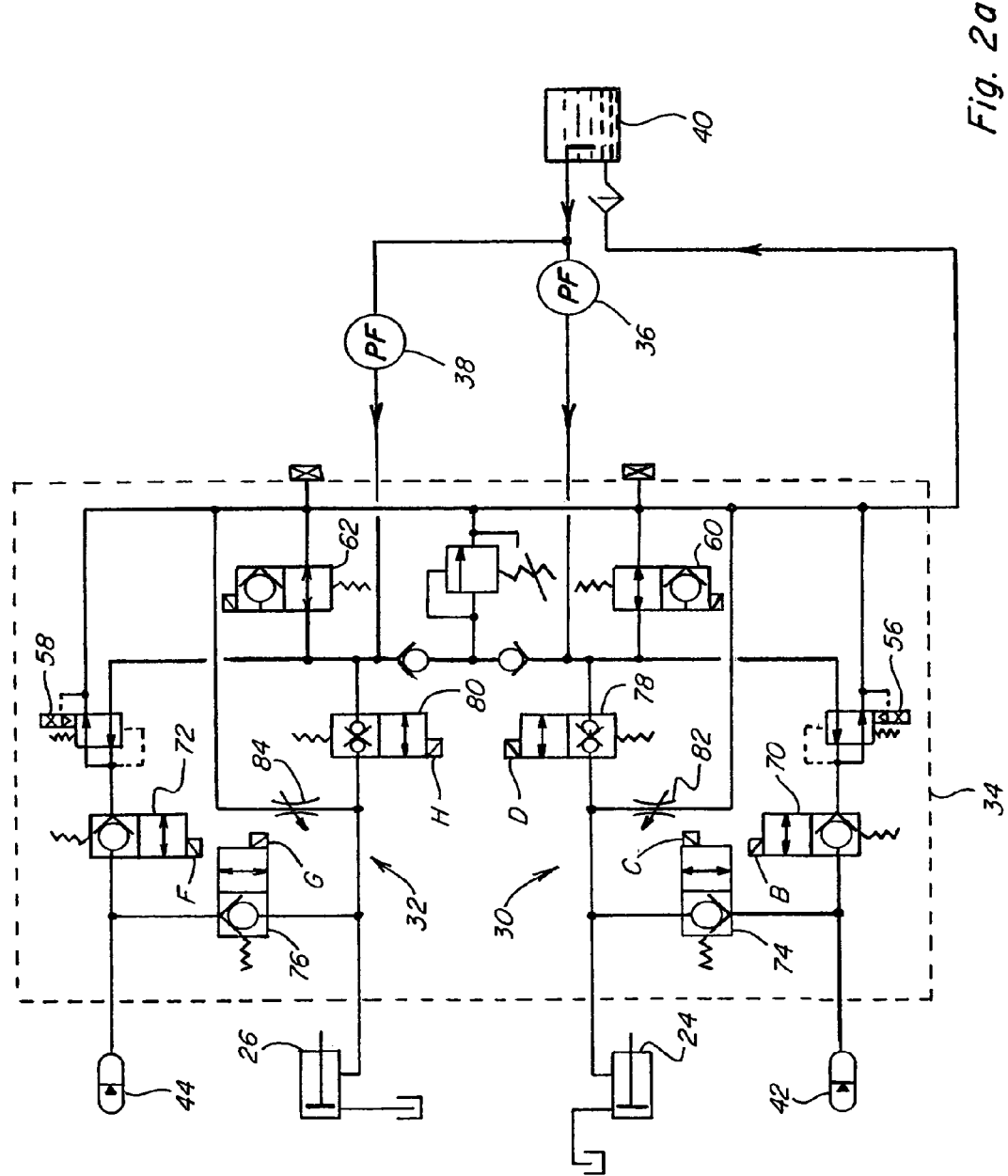
FIG. 2a is a hydraulic schematic view of another embodiment of a hydraulic system with which the instant invention can be used, which is an example of an independent system.

Directing attention now to FIG. 2, the hydraulic control system for left cylinder 24 and right cylinder 26 can be seen to include a single electro-hydraulic subsystem 30. This is representative of a non-independent system. In FIG. 2a, on the other hand, two basically similar electro-hydraulic subsystems 30 and 32 are used for controlling cylinders 24 and 26, respectively. This represents an independent system. For convenience of assembly and operation, in both instances, the majority of the components are housed in a single valve body 34 with appropriately located ports and other necessary connection devices and fixtures. Explaining the non-independent system of FIG. 2, a fixed displacement pump 36 moves the hydraulic fluid into subsystem 30 from reservoir 40, through the various circuits or fluid paths, as directed by control valves, to accumulator 42, to hydraulic cylinders 24 and 26 and back to reservoir 40 as appropriate. Explaining the independent system of FIG. 2a, a pair of fixed displacement pumps 36, 38 move the hydraulic fluid into respective subsystems 30, 32 from reservoir 40, through the various circuits as directed by control valves, to accumulators 42, 44, to hydraulic cylinders 24, 26 and back to reservoir 40 as appropriate.

Figure 3A:
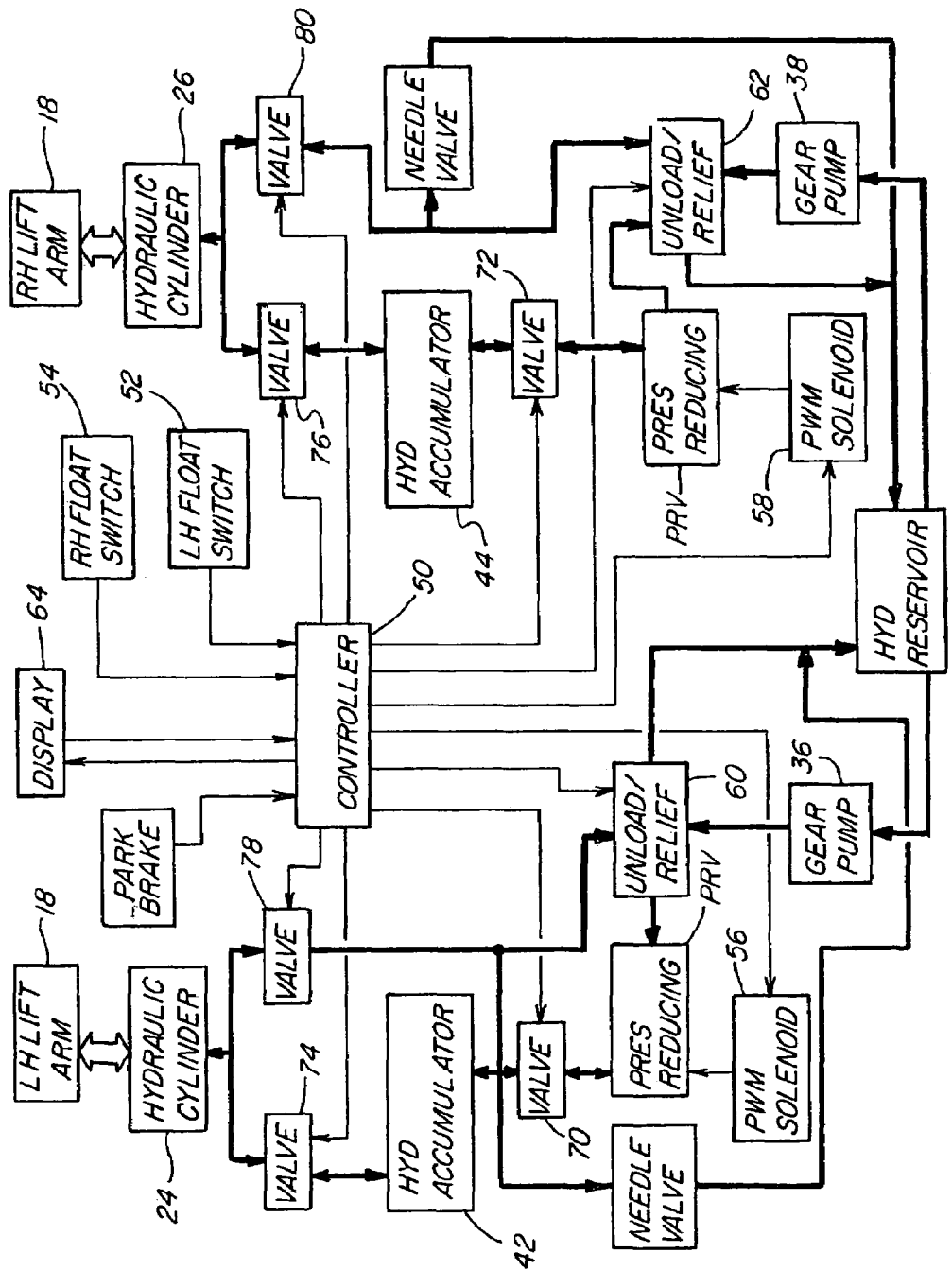

FIG. 3 provides a more detailed depiction of the complete control system and subsystems of the non-independent system. FIG. 3a does so for the independent system. Referring to FIG. 3a, and as also representative of FIG. 3, the left hand ("LH") and right hand ("RH") hydraulic systems, as shown also in FIG. 2a, additionally depict the electrical control and mechanical subsystems. Importantly, this figure depicts the multi-channel programmable controller 50 which exchanges electrical signals from the LH and RH float switches 52, 54, the PWM (pulse width modulated) solenoids 56, 58 which control the proportional pressure reducing valves PRV, the unload/relief valves 60, 62, and other valves to manage the lift and flotation functions as established by the operator through the appropriate switches as shown on display 64.

Figure 34:
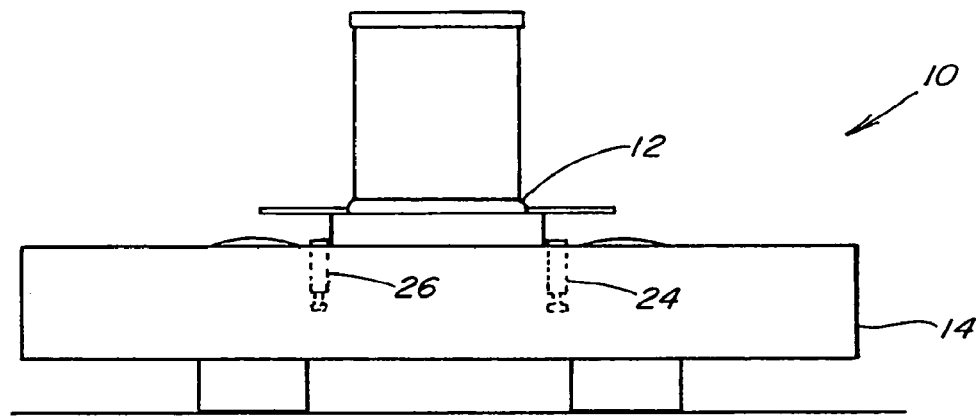
FIG. 34 is another simplified front view of the machine of FIG. 1, with the header in an elevated transport position.
Figure 33:
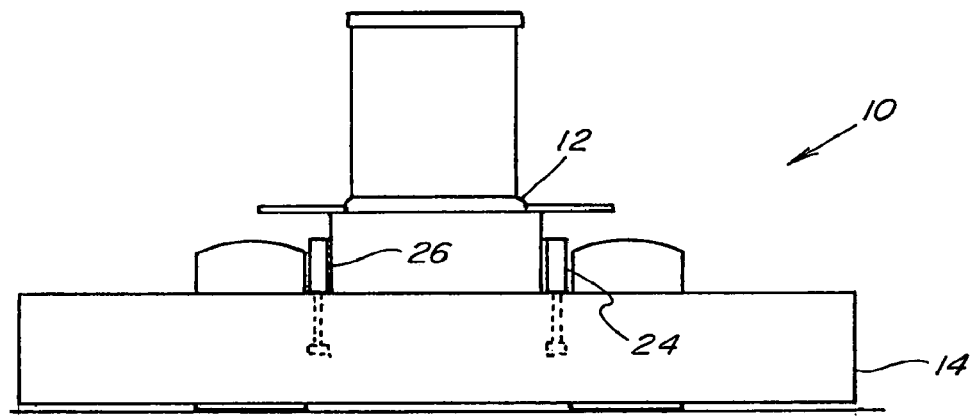
FIG. 33 is another simplified front view of the machine of FIG. 1, with the header in a lowered position.
Figure 32:
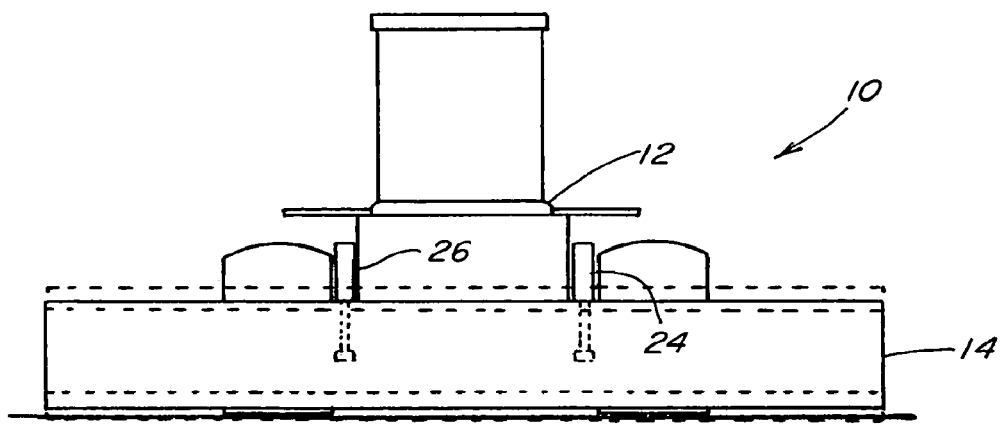
FIG. 32 is simplified front view of the machine of FIG. 1, illustrating in dotted lines a header of the machine in alternative positions.

In operation, referring also to FIGS. 32, 33, 34, 35 and 36, and as explained above, each side of the header is supported by a single cylinder 24 or 26 that performs both the flotation and lift functions. In the independent system of FIGS. 2a and 3a, for even lifting (FIGS. 32, 33 and 34) and flotation of an unbalanced header, each cylinder has its own control valve, pump, and accumulator. The operator sets the desired flotation force by actuating rocker switches 52, 54 located on the operator's console. One switch position allows hydraulic oil to enter an accumulator (increasing the hydraulic pressure) which reduces the header contact force (flotation) with the ground. The other position allows oil to exit that accumulator (reducing the hydraulic pressure) which increases the header contact force with the ground. To evenly float unbalanced headers, there are separate switches to adjust each side independently. Once the flotation forces are set, the control valves will return to this preset flotation condition whenever the float mode is selected, irrespective of subsequent header lift and lower operations (FIGS. 32, 33 and 34). The independent sub-systems 30 and 32 can also be operated independently or to different extents, to achieve a tilting of header 14 in either direction, as illustrated in FIGS. 35 and 36.

In the non-independent system of FIGS. 2 and 3, the operator sets the flotation force for both cylinders using single switch 52. A hydraulic counterweight capability for unbalanced conditions is provided by turning a manual control valve 66 to apply more weight (hydraulic pressure) to the light side of the header until the header raises and lowers to a level condition. If too much weight is applied, the operator simply turns the valve in the opposite direction. Once the correct setting is established, the hydraulic counterweight will not need to be readjusted during machine operation. Re-adjustment will only become necessary if the header builds up with debris or upon exchange with another header. For headers that experience severe changes in balance during normal operation, i.e., draper headers with deck-shift, an electro-hydraulic valve can be installed in place of the manual control valve. This electro-hydraulic valve is adjusted from a rocker switch on the operator's console. The operator then sets the hydraulic counterweight for each deck position. Once these values are established, the control valve will adjust automatically as the deck positions are selected.

Cylinders 24 and 26 are utilized for both raising and lowering header 14 relative to tractor 12 of windrower 10 (FIGS. 32, 33 and 34) and, in the instance of the independent system of FIGS. 2a and 3a, also for sidewardly tilting header 14 relative to tractor 12 (FIGS. 35 and 36). For these purposes, the independent system of FIGS. 2a and 3a includes valves 70 and 72, controlled by solenoids B and F, respectively; valves 74 and 76, controlled by solenoids C and G, respectively; and valves 78 and 80, controlled by solenoids D and H, respectively. Solenoids B and F; C and G; and D and H, as well as PWM solenoids 56 and 58, are connected to controller 50 via suitable conductive paths, such as wires or the like, for receiving commands and/or operating signals therefrom.

Controller 50 is programmed according to a preferred method of the instant invention for managing subsystems 30 and 32, for automatically executing a variety of operating modes for the flotation and lift system, which include, but are not limited to, a wake-up mode; a normal mode including float control; a charge accumulator mode; a transport mode; and a header remove mode, responsive to various inputs and or sensed conditions, so as to have the capability to seamlessly and easily transition between the modes, for achieving operational advantages, including improved smoothness and efficiency. The program incorporating the steps of the preferred method of the instant invention are set forth in written form generally in lines 175-940 of FIGS. 4 through 30. Operating steps of the method of the invention as embodied in the program are illustrated in the diagram of FIGS. 31, 31*a*, 31*b* and 31*c*.

More specifically, the program provides a general managing or operating architecture of the independent subsystems 30 and 32 of the independent system, and is also configured for operating subsystem 30 of the non-independent system. Controller 50 sends programmed signals, in the form of current of variable values, to PWM solenoids 56 and 58 which control the respective PRVs, which responsively control the amount of flotation force or pressure, as set by the operator using float switches 52 and 54, also referred to sometimes in the program as trim switches. The PRVs are current controlled/regulated. Controller 50 is preferably of the type known as a micro-controller or an embedded controller unit (ECU). The accumulators replace traditional springs.

Operation is generally as follows:

raising header 14 (FIGS. 32, 33 and 34) through a first side or fluid path of the circuit extending between the source or sources of pressurized fluid (pumps 36 and 38) and the respective fluid cylinders 24 and 26, using solenoids D and H, respectively;

flotation is achieved through a second fluid path extending between the respective fluid cylinders 24 and 26 and respective accumulators 42 and 44, with flotation force setting easily adjusted with the press of switch 52 and/or switch 54 for changing conditions;

lowering header 14 is accomplished through a third fluid path including the PRV circuit and connecting with the respective pump 36 or 38, reservoir 40 and the second fluid path, using solenoids B, C and 56 of subsystem 30, and solenoids F, G and 58 of subsystem 32;

floatation settings can be remembered for a header that has varying lateral weight distribution (e.g., the "Honey Bee") and can be recalled immediately when a new lateral position is executed;

execute a charge accumulator cycle via the PRV circuit (second and third) fluid paths) at the first press of a header lower switch—variable with engine rpm.

Referring also to FIGS. 4, 5 and 6, general steps of mapping, setting variables and function prototyping are illustrated. Referring to FIG. 7 in lines 185 through 210, and to diagram 86 of FIG. 31, steps of a header wakeup mode of the system management scheme of the invention are set forth. In this mode, the objective is restoration of operation of header 14 in a normal mode after a period of inactivity. In each of the instance of header wakeup, whether by a received header raise or lower command, or activity of switches 52 and/or 54, controller 50 will respond in an appropriate manner. If the received command is a header raise command, controller 50 can operate normally to immediately permit turning on of solenoids D and H for allowing pressurized hydraulic fluid flow from pumps 36 and 38 through the first fluid paths, that is, through valves 78 and 82 cylinders 24 and 26. If, on the other hand, the received command is a header lower command, if accumulators 42 and 44 are not at least minimally charged, lift arms 18 may lower or drop more rapidly than desired. This is to be avoided. Therefore, controller 50 will automatically proceed to check flotation switch status and charge accumulators 42 and 44 using the second and third fluid paths, if necessary, prior to executing a header lower command. This is set forth generally in lines 211-350 of FIGS. 8 through 11.

This will entail getting trim switch information (float switches 52 and 54), which will include checking the switches for activity (lines 223-245), and getting the previous flotation force settings and applying them if the accumulators are not being charged responsive to switch 52 and/or 54 activity (lines 246-265). Note here that, because systems 30 and 32 can be operated separately, flotation force settings for each will be obtained, including any offsets required.

If charging is required, PWM solenoids 56 and 58 will receive appropriate signals for the desired flotation set points, respectively, to set the pressurization (lines 285-290), and solenoids B and F will be turned on, to effect the pressurization of the accumulators 42 and 42 to the set pressure point or points. After this has occurred, execution of a header lower command can occur. This is effected by turning on solenoids B, F, C and G (e.g., lines 355-360; 385-390), which allows hydraulic fluid flow from cylinders 24 and 26 through the second and third fluid paths to reservoir 40.

At any time, header 14 can be raised by turning on of solenoids D and H for allowing pressurized hydraulic fluid flow from pumps 36 and 38 through valves 78 and 82 cylinders 24 and 26.

Once accumulators 42 and 44 are charged, a float mode is effected by turning on solenoids C and G, to allow fluid flow between cylinder 24 and accumulator 42, and between cylinder 26 and accumulator 44.

From time to time, it will be desirable to remove header 14 from windrower 10. This typically entails raising the header using cylinders 24 and 26. Jack stands, either included on and pivotable downward from header 14, or separate therefrom, or other support structure for supporting header 14 independently of lower arms 18, are then deployed. Pins connecting header 14 with lower arms 18 are then removed. Lower arms 18 can now be lowered and separated from header 14, and upper link 20 disconnected, to enable driving windrower 10 separately of and away from header 14. Since any flotation force would be outwardly acting on cylinders 24 and 26, the presence of such flotation force is typically viewed as a detriment when it is desired to disconnect lower arms 18 from header 14. Lower arms 18 are typically cooperatively received in cups on header 14 and often require some exertion of downward force to release from the cups. Sometimes, the operator will exit the operator cab of windrower 10 and apply his or her weight to lower arms 18 to release them from header 14. Any upward force, such as a flotation force, would counter this, and thus be undesirable. As result, the operator typically will adjust or set the flotation force using float switches 52 and 54 down to zero or near zero. Then, when arms 18 are lowered using a header lower command to operate cylinders 24 and 26, because there is no upwardly directed flotation force, arms 18 will typically drop or fall from header 14.

Sometimes, it will be desirable to have the capability for the operator to exit the machine cab to disconnect arms 18 from header 14. Typically, the operator will turn the park brake on when exiting the cab. If the park brake is on, controller 50 will automatically maintain a zero flotation force for a predetermined period of time, for instance, five minutes, for the operator to exit the cab and loosen and/or disconnect arms 18 from the header.

In the header remove mode, it may be desirable to raise arms 18, which can be accomplished by a header raise command to operate cylinders 24 and 26. However, from a raised position, it will typically be undesirable to execute a header lower command to lower arms 18 with header 14 attached without some flotation force present, as arms 18 will essentially just drop. Therefore, it is desirable to manage this situation using an automatic routine for operation of controller 50 which accommodates operation of systems 30 and 32 in a header remove mode.

Figure 31:
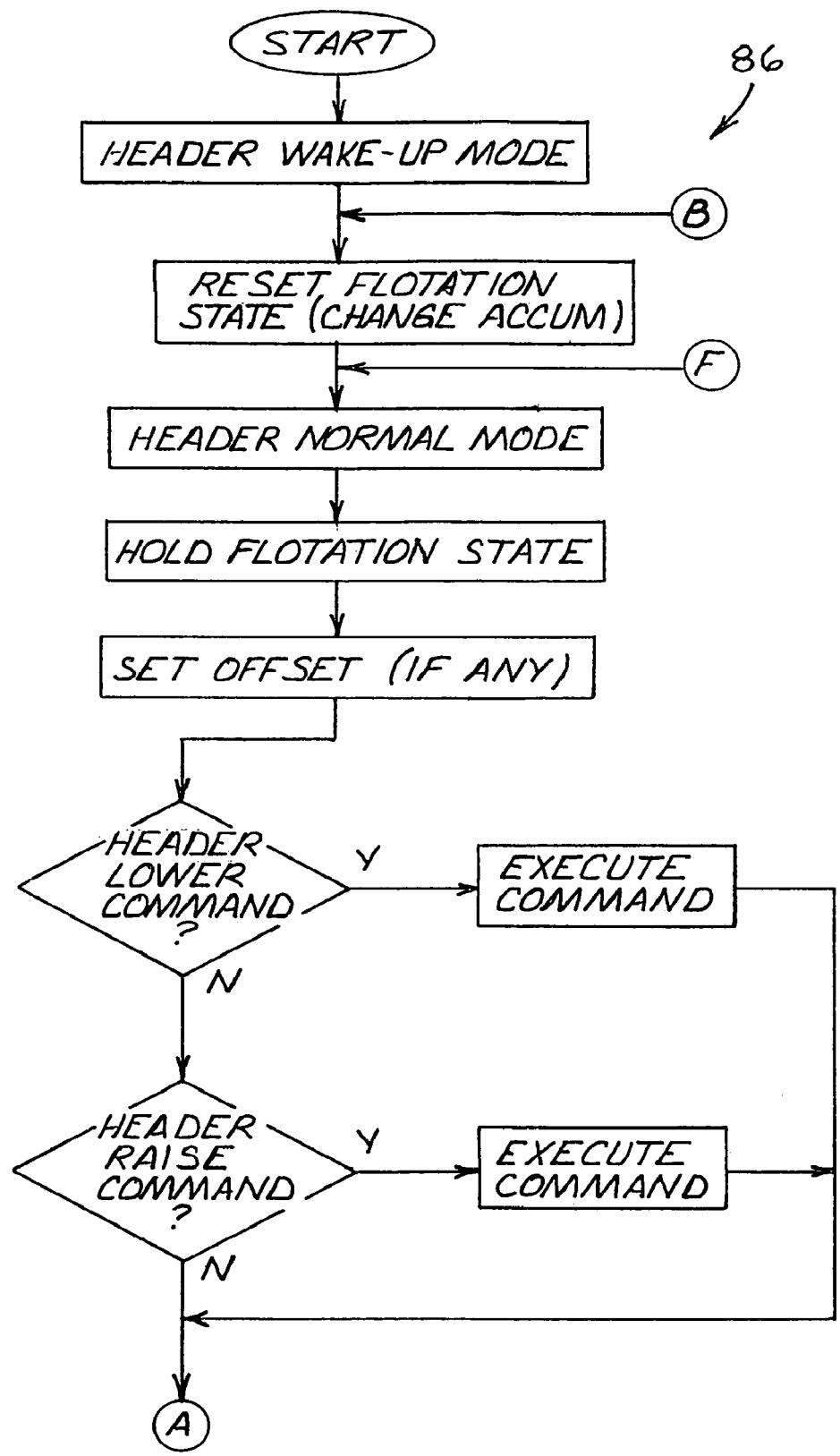
FIG. 31 is a high level flow diagram showing steps of aspects of a preferred method of the invention.
Figure 31A:
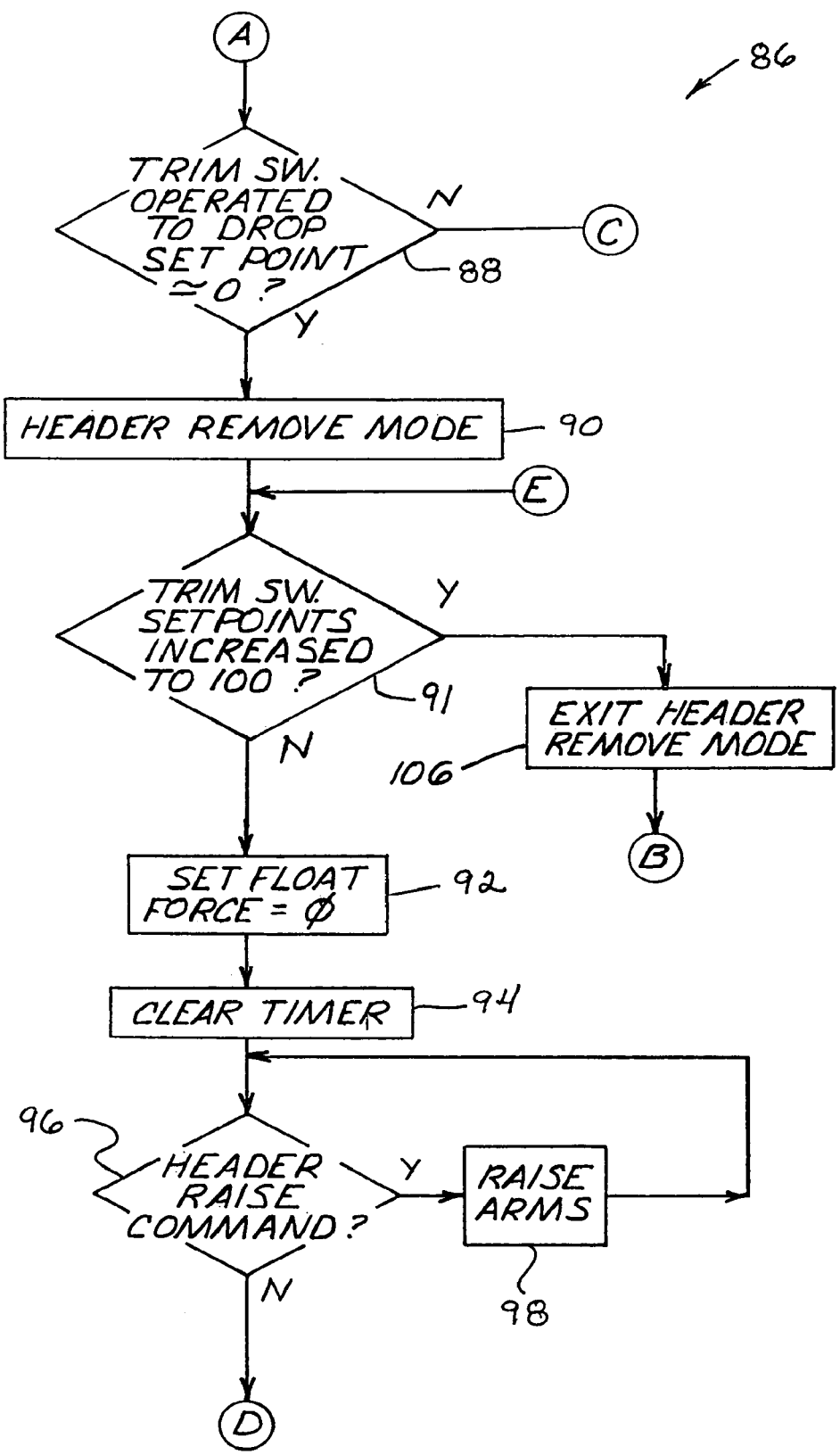
FIG. 31a is a continuation of the diagram of FIG. 31.
Figure 31B:
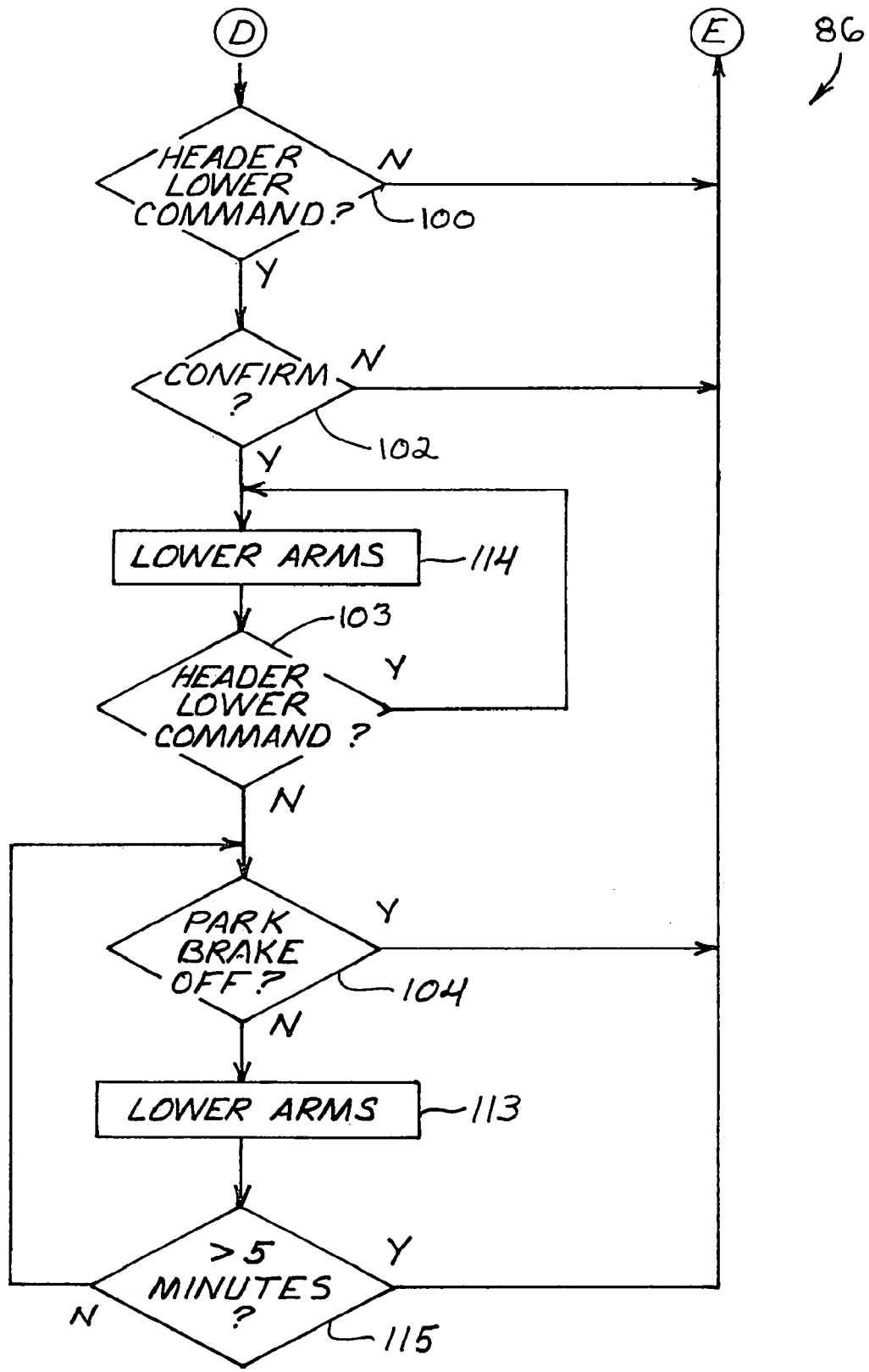
FIG. 31b is a high level flow diagram showing steps of other aspects of the preferred method of the invention.
Figure 31C:
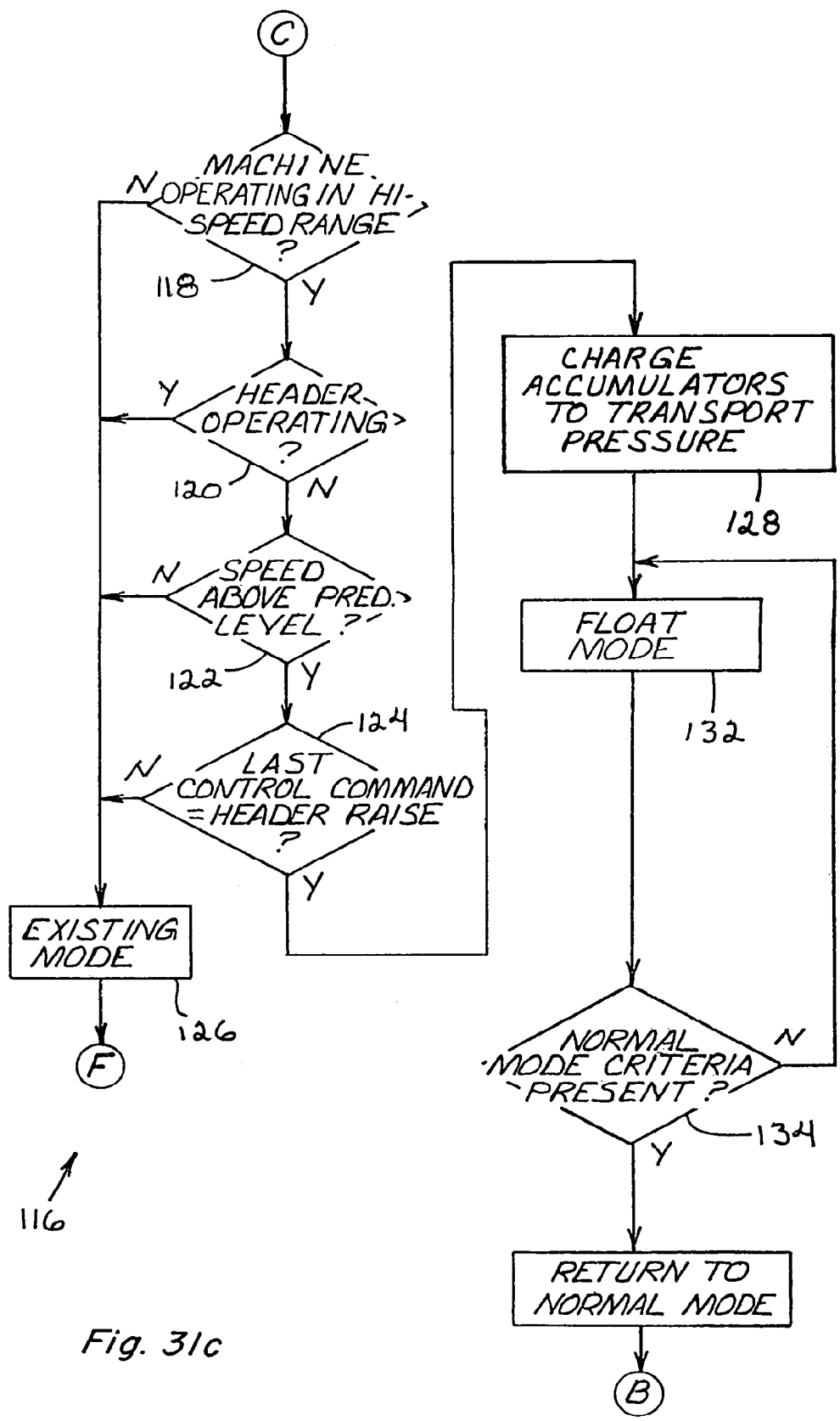
FIG. 31c is a high level flow diagram showing steps of other aspects of the preferred method of the invention.

Directing attention to the program listing of FIGS. 15 through 23 (lines 540-855), and also continuing as denoted by balloon A from flow diagram 86 of FIG. 31 to that of FIGS. 31a and 31b, steps for operation in a header remove mode, are shown. This mode is initiated by float switches 52 and 54 having been operated to drop the set point for the flotation force to zero, or near or about zero, as denoted by decision block 88. That is, a flotation force level which substantially ineffective for flotation purposes. This is because it is believed that the operator will typically not zero switches 52 and 54 unless it is desired to remove the header. When controller 50 recognizes or initiates the header remove mode, as denoted at block 90, it will naturally determine at decision block 91 that the trim switch set points are lower than 100 and will set the flotation force to zero (line 546) and clear or reset a 5 minute timer (line 567), as denoted at blocks 92 and 94. If a header raise command is present, as determined at decision block 96, controller 50 will set a flag (line 571), and will proceed to execute the command in due course (lines 782-820) by actuating valves 78 and 80 via solenoids D and H to raise arms 18, as denoted at block 98. This is done without first requiring charging the accumulators. Controller 50 will then remain in the header remove mode and return to decision block 96. If, at decision block 96, no header raise command is present, controller 50 will proceed, as denoted by following balloon D, to check for the presence of a header lower command, as denoted at decision block 100 in FIG. 31b. If no header lower command is present, following balloon E, controller 50 will remain in the header remove mode (PRVs at zero pressure such that flotation force equals zero), or go to some other suitable location such as to decision block 96. If, on the other hand, at decision block 100, a header lower command is detected, controller 50 will output a signal to the operator for a confirmation from the operator that a header lower command is desired (lines 580-585), as denoted at decision block 102. This required confirmation can be in the form of a predetermined operator input, such as another push of the header lower switch (line 582). If no confirmation is received, e.g., the switch is not pushed, controller 50 will disregard the command and follow balloon E and loop back to the top of the header remove routine, or to another suitable location, such as decision block 96. If, at decision block 102, the header lower command is confirmed, controller 50 will proceed to lower the arms, as denoted at block 114, and check for termination of a header lower command, as denoted at decision block 103. If the lower command is present the arms will continue to be lowered. If not, the controller will determine if the park brake is off, as denoted at decision block 104. If yes, it will follow balloon E to the top of the header remove mode. If no, it will lower the arms as denoted at the block 113, and proceed to check if the time is greater than 5 minutes, as denoted at block 115. If yes, the controller will follow balloon E to the top of the routine. If no, it will loop back to decision block 104.

The allotted five minute time is intended to allow the operator time to exit the cab and take necessary steps to disconnect or detach arms 18 from header 14, such as prying the arms loose from the cups on the header.

During the normal course of looping through to the top of the header remove routine at balloon E, controller 50 will determine if the trim switch set points are increased to 100 or more, as denoted at decision block 91, and if yes, controller 50 will exit the header remove mode, as denoted at block 106, and follow balloon B to the location shown in FIG. 31. If the set points are not increased to 100, controller 50 will remain looping through this header remove section until the exit condition is met.

Also sometimes, it will be desirable for automatically controlling the lift and flotation system for raising header 14 from a lowered position to an elevated transport position in a transport mode. Referring also to FIGS. 23 through 25 (see generally lines 860-940), and flow diagram 116 of FIG. 31c, this mode is illustrated. In this mode, the header will automatically raise to the transport position (weight supported on the accumulator or accumulators 42 and 44) when certain criteria are met, i.e., when the machine is moving in the high speed range (decision block 118); the header is not operating (decision block 120; the machine speed is above a predetermined a level, for instance, 10 mph (decision block 122); and the last control command or push was "header raise" (decision block 124). If the criteria are not met, controller 50 will remain in its existing operating mode as denoted at block 126. If the criteria are met, controller 50 will begin executing a routine that pressurizes accumulators 42 and 44 to a transport pressure value, as denoted at block 128, and connects them in fluid communication with lift/flotation cylinders 24 and 26. More particularly, referring generally to lines 875-890, this involves turning on solenoids B and F to connect accumulators 42 and 44 with the pressurized hydraulic fluid condition regulated by the PRVs. The PRVs would be programmed with a transport float pressure value. As a result, hydraulic oil from pumps 36 and 38 would be directed as required through the PRVs and valves 70 and 72 controlled by solenoids B and F to accumulators 42 and 44, such that accumulators 42 and 44 would be pressurized to the transport float pressure value. The accumulator or accumulators are then switched in for operation in the float mode, as denoted at block 132. To switch in the accumulators 42 and 44, they are connected in fluid communication with lift/flotation cylinders 24 and 26, respectively, by turning on solenoids C and G, as generally denoted in lines 895-920. The transport pressure value can be chosen such that the header can be raised fully against the upper stop or held slightly away to allow cushioning in both directions. If held slightly away from, that is, below the upper stop, the header will be allowed to rise up by the slight amount. Operation in the normal mode is automatically re-established (following balloon B to FIG. 31) from the transport mode when certain criteria are met or are present, as denoted at decision block 134. Exemplary criteria are set forth in the program.

Criteria for returning to the normal mode, as denoted generally by lines 920-925, can include, but are not limited to, a header lower switch being pushed; a machine speed of less than or below a predetermined speed, for instance, 5 mph; the machine is operated in a speed range other than the high-speed range; or the header PTO is not off. Presence of any one of these criteria can cause the program to return to the normal operating state.

As a result of the system and method of the present invention, the header lift and flotation system of a harvesting machine such as a windrower is provided with an automatic management scheme which provides a system wake-up mode; a charge accumulator mode; a transport mode; and a header remove mode, each of which is initiated by a designated input or inputs and/or presence of one or more predetermined conditions.

It will be obvious to those skilled in the art that various changes may be made without departing from the scope of the invention and the invention is not to be considered limited to what illustrated in the drawings and described in the specification.

What is claimed is:

1. A method of managing a lift and flotation system interconnecting a header and a frame of an agricultural harvesting machine, comprising:
   providing a programmable controller in operative control of the header lift and flotation system, the controller being automatically operable in a normal mode for controlling the system to raise the header when a header raise command is present, for controlling the system to lower the header when a header lower command is present, and for setting a flotation force of the system equal to an inputted value therefor;
   providing a device controllable by an operator for inputting a selectable value for the flotation force to the controller, including a value of zero or about zero and at least one value greater than about zero;
   wherein responsive to an inputted value for the flotation force being zero or about zero, the controller will automatically operate in a header remove mode to control the system to hold the flotation force at the inputted value of zero or about zero, including when the header raise command is present; and
   wherein the controller will automatically raise the header to a predetermined elevated transport position when at least the following conditions are present:
   the machine is operating in a high speed range; and
   a speed of the machine is above a predetermined level.

2. The method of claim 1, wherein when in the header remove mode, if the header raise command is present, the controller will control the system to raise the header while holding the flotation force at the inputted value of zero or about zero.

3. The method of claim 1, wherein when in the header remove mode, when the header lower command is present, the controller will request operator confirmation thereof, and if the confirmation is received, then execute the header lower command.

4. The method of claim 1, wherein when initiating or in the header remove mode, if a park brake of the machine on, the controller will automatically hold the flotation force at the inputted value of zero or about zero for a predetermined time period.

5. The method of claim 1, wherein the device controllable by an operator for inputting a selectable value for the flotation force to the controller comprises a float switch.

6. The method of claim 1, comprising a further step of automatically operating the system in a float mode when the header is in the elevated transport position.

7. The method of claim 6, comprising a further step of automatically changing the operating mode of the system from the transport mode to a normal mode responsive to presence of either of the following conditions:
   the machine is no longer operating in the high-speed range; and
   the speed of the machine falls below a predetermined value.

8. The method of claim 7, wherein the predetermined level is about 10 mph and the predetermined value is about 5 mph.

9. The method of claim 1, wherein during a period of inactivity, if a header raise command or a header lower command is received, the controller will automatically control the system to increase the flotation force to a predetermined level.

* * * * *